United States Patent
Gotou et al.

(10) Patent No.: US 6,813,229 B1
(45) Date of Patent: Nov. 2, 2004

(54) OPTICAL DISC READOUT METHOD AND APPARATUS WITH FOCUSING

(75) Inventors: Souzyu Gotou, Yokohama (JP); Kiichiro Koide, Tokyo (JP); Seiichi Itou, Hidaka (JP); Youichi Harasawa, Zama (JP); Toshiaki Kitano, Hachiouji (JP); Tetsuya Baba, Cyofu (JP); Toshihiro Sasaki, Musashimurayama (JP)

(73) Assignee: Kabushiki Kaisha Kenwood, Tokyo (JP)

(*) Notice: Subject to any disclaimer, the term of this patent is extended or adjusted under 35 U.S.C. 154(b) by 0 days.

(21) Appl. No.: 09/509,551
(22) PCT Filed: Oct. 8, 1998
(86) PCT No.: PCT/JP98/04551
§ 371 (c)(1), (2), (4) Date: Apr. 12, 2000
(87) PCT Pub. No.: WO99/19868
PCT Pub. Date: Apr. 22, 1999

(30) Foreign Application Priority Data

Oct. 14, 1997 (JP) .............................................. 9-297804
Oct. 14, 1997 (JP) .............................................. 9-297806

(51) Int. Cl.[7] .............................................. G11B 7/00
(52) U.S. Cl. .............................. 369/44.37; 369/44.29
(58) Field of Search .................... 369/44.25, 44.29, 369/44.35, 44.37, 44.38, 44.41, 53.11, 53.23, 53.25, 53.28, 112.01, 112.03, 112.04, 112.05, 44.36, 124.02, 124.03, 124.1, 124.11, 124.12

(56) References Cited

U.S. PATENT DOCUMENTS

| 5,181,161 A | 1/1993 | Hirose et al. ............ 369/47.26 |
| 5,587,985 A | 12/1996 | Sano et al. ............ 369/124.02 |
| 5,729,512 A | 3/1998 | Alon ....................... 369/44.32 |
| 5,781,521 A | 7/1998 | Kim .......................... 369/59.2 |
| 5,828,637 A | 10/1998 | Kim ......................... 369/44.28 |
| 5,875,164 A | 2/1999 | Yamakawa et al. ...... 369/44.29 |

FOREIGN PATENT DOCUMENTS

| EP | 0 441 435 A1 | 8/1991 |
| EP | 0 573 021 A1 | 12/1993 |
| JP | 02-294936 | 12/1990 |
| JP | 04-141825 | 5/1992 |
| JP | 04-238123 | 8/1992 |
| JP | 5-325217 | 12/1993 |
| JP | 07-153079 | 6/1995 |
| JP | 8-315365 | 11/1996 |
| JP | 8-339568 | 12/1996 |
| WO | WO 94/19797 | 9/1994 |

OTHER PUBLICATIONS

Examiner Refusal Decision mailed Sep. 17, 2002 and English Translation.
International Search Report dated Dec. 28, 1998.
Official Letter, JP Application No. 09–297806, Japanese Patent Office, dated Jan. 16, 2004.
Examiner Office Letter dated Feb. 19, 2002 and English Translation.

*Primary Examiner*—Thang V. Tran
*Assistant Examiner*—Bach Vuong
(74) *Attorney, Agent, or Firm*—Eric J. Robinson; Robinson Intellectual Property Law Office P.C.

(57) ABSTRACT

An optical system including an objective lens applies five light beams ($3_1$ to $3_5$) generated by an optical pickup to a plurality of adjacent tracks on a signal plane of a CD-ROM. Light beams reflected from the signal plane are detected with photodetectors ($PD_1$ to $PD_6$), and in accordance with the detection outputs of the photodetectors ($PD_1$ to $PD_5$), a record data read system reads at the same time data recorded on respective tracks applied with the light beams ($3_1$ to $3_5$), and outputs to read data in the record order of CD-ROM by preventing the read data from being duplicated or omitted. Prior to reading record data, a system controller performs an offset bias adjustment of a focus servo system.

10 Claims, 23 Drawing Sheets

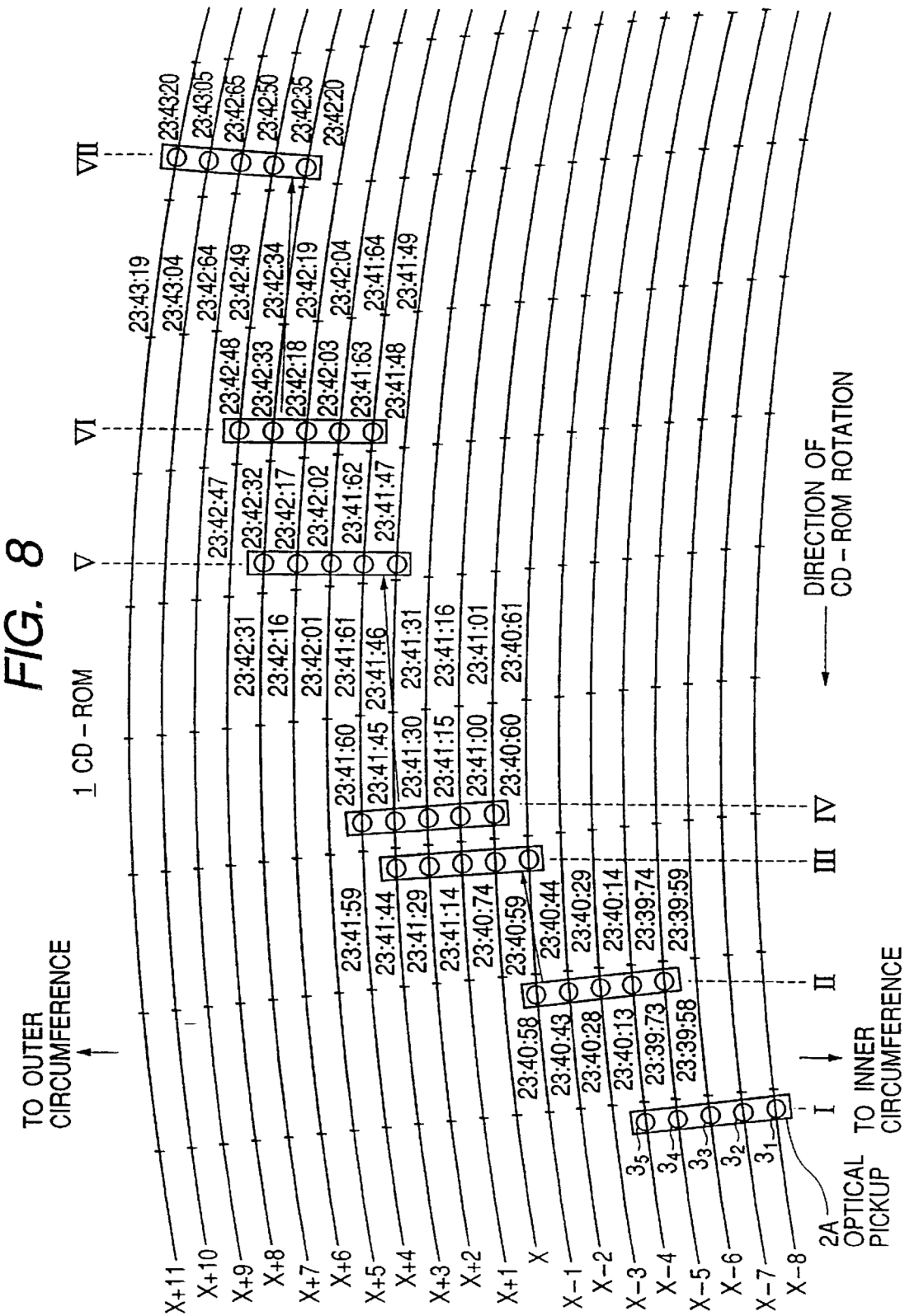

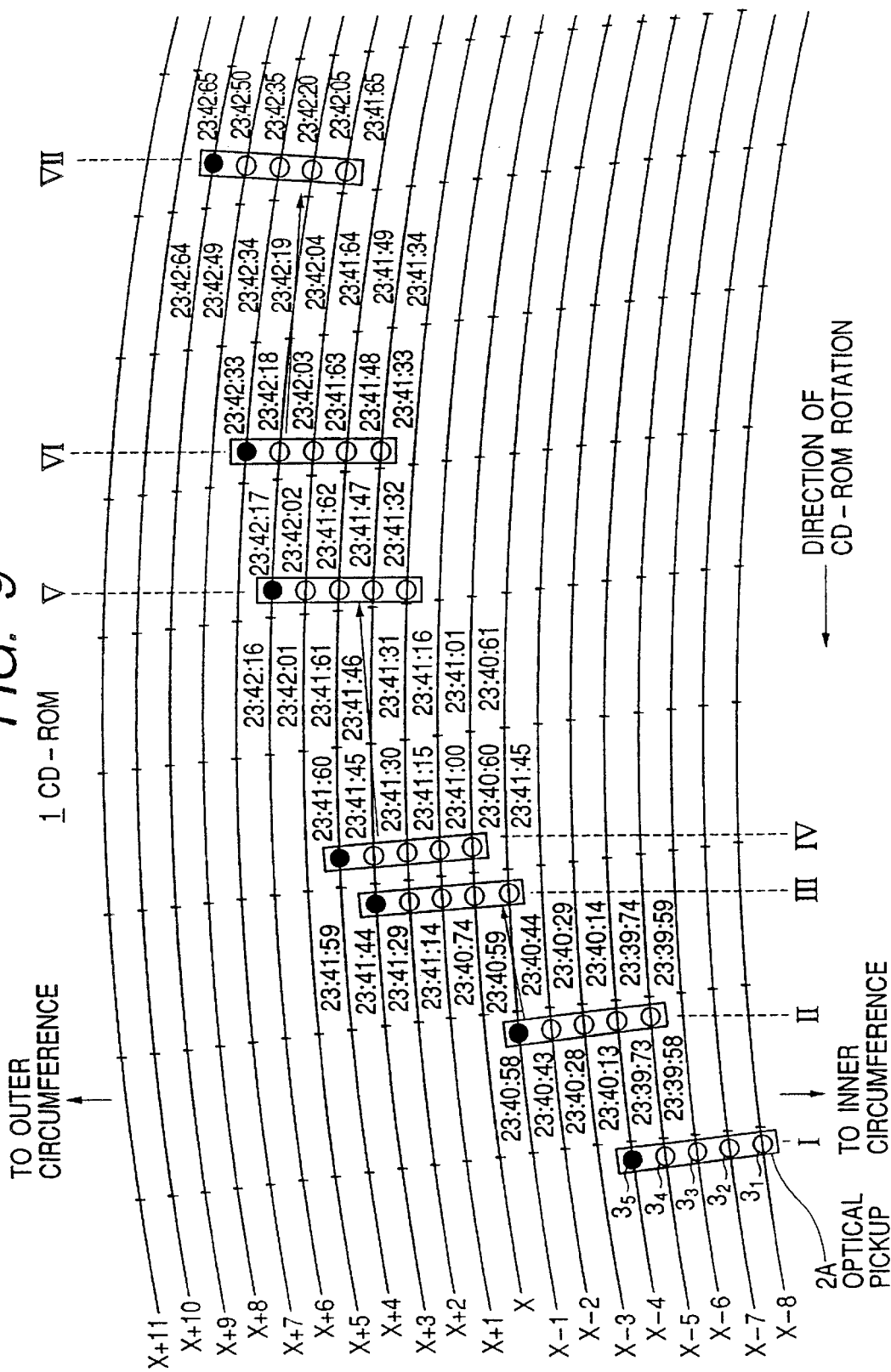

FIG. 10

| $33_1$ MEMORY | $A_{1s}$ | $A_{1e}$ | | | | | | | $a_{1s}$ | $a_{1e}$ | | | | |
|---|---|---|---|---|---|---|---|---|---|---|---|---|---|---|
| 23:40:60 | $A_{1s}(1)$ | $A_{1e}(1)$ | | | | | | 23:41:33 | $a_{1s}(1)$ | $a_{1e}(1)$ | | | | |
| 23:40:61 | $A_{1s}(2)$ | $A_{1e}(2)$ | | | | | | 23:41:34 | $a_{1s}(2)$ | $a_{1e}(2)$ | | | | |
| ...... | | | | | | | | ...... | | | | | | |
| 23:40:74 | $A_{1s}(15)$ | $A_{1e}(15)$ | | | | | | 23:41:47 | $a_{1s}(15)$ | $a_{1e}(15)$ | | | | |

1ST AREA / 2ND AREA — $AT_1$ $33_2$, $AT_2$: 23:41:00 ... 23:41:14 / 23:41:48 ... 23:42:62

| 33₁ MEMORY | A₁ₛ A₁ₑ | | | | | | a₁ₛ a₁ₑ | | | | | |
|---|---|---|---|---|---|---|---|---|---|---|---|---|
| | A₁ₛ(1) | A₁ₑ(1) | ... | A₁ₛ(15) | A₁ₑ(15) | ... | a₁ₛ(1) | a₁ₑ(1) | ... | a₁ₛ(15) | a₁ₑ(15) | ... |
| | A₁ₛ(2) | A₁ₑ(2) | | A₁ₛ(16) | A₁ₑ(16) | A₁ₛ(30) A₁ₑ(30) | a₁ₛ(2) | a₁ₑ(2) | | a₁ₛ(16) | a₁ₑ(16) | a₁ₛ(30) a₁ₑ(30) |
| AT₁ | 23:40:60 | 23:40:61 | ... 23:40:74 | 23:41:00 | ... | 23:41:14 | 23:41:18 | 23:41:19 | ... 23:41:62 | 23:41:63 | ... | 23:42:02 |

1ST AREA · 2ND AREA

33₂ — A₂ₛ A₂ₑ / a₂ₛ a₂ₑ / AT₂

| 33₃ | A₃ₛ | A₃ₑ | | | | | a₃ₛ | a₃ₑ | | | | |
|---|---|---|---|---|---|---|---|---|---|---|---|---|
| | A₃ₛ(1) | A₃ₑ(1) | ... | A₃ₛ(15) | A₃ₑ(15) | A₃ₛ(30) A₃ₑ(30) | a₃ₛ(1) | a₃ₑ(1) | ... | a₃ₛ(15) | a₃ₑ(15) | a₃ₛ(30) a₃ₑ(30) |
| | A₃ₛ(2) | A₃ₑ(2) | | A₃ₛ(16) | A₃ₑ(16) | | a₃ₛ(2) | a₃ₑ(2) | | a₃ₛ(16) | a₃ₑ(16) | |
| AT₃ | 23:41:15 | 23:41:16 | ... 23:41:29 | 23:41:30 | ... | 23:41:44 | 23:42:03 | 23:42:04 | ... 23:42:17 | 23:42:18 | ... | 23:42:32 |

| 33₄ | A₄ₛ | A₄ₑ | | | | | a₄ₛ | a₄ₑ | | | | |
|---|---|---|---|---|---|---|---|---|---|---|---|---|
| | A₄ₛ(1) | A₄ₑ(1) | ... | A₄ₛ(15) | A₄ₑ(15) | A₄ₛ(30) A₄ₑ(30) | a₄ₛ(1) | a₄ₑ(1) | ... | a₄ₛ(15) | a₄ₑ(15) | a₄ₛ(30) a₄ₑ(30) |
| | A₄ₛ(2) | A₄ₑ(2) | | A₄ₛ(16) | A₄ₑ(16) | | a₄ₛ(2) | a₄ₑ(2) | | a₄ₛ(16) | a₄ₑ(16) | |
| AT₄ | 23:41:30 | 23:41:31 | ... 23:41:44 | 23:41:45 | ... | 23:41:59 | 23:42:18 | 23:42:19 | ... 23:42:32 | 23:42:33 | ... | 23:42:47 |

33₅ — A₅ₛ A₅ₑ / a₅ₛ a₅ₑ / AT₅

OPTICAL DISC READOUT METHOD AND APPARATUS WITH FOCUSING

BACKGROUND OF THE INVENTION

1. Field of the Invention

The present invention relates to a multibeam type optical disc read apparatus, and more particularly to a multibeam type optical disc read apparatus in which different light beams are applied at the same time to a plurality of adjacent tracks of an optical disc, such CD-ROM, CD-WO, DVD, DVD-ROM, DVD-RAM, MO, and LD and data recorded on the tracks applied with the light beams are read with a record data read system in accordance with a detected output of each reflected light beam.

2. Description of the Related Art

A multibeam method is one of the methods of reading record data from a CD-ROM at high speed. With this method, different light beams are applied at the same time to a plurality of adjacent tracks of an optical disc formed with a spiral track, data recorded on the tracks applied with the light beams are read with a record data read system for each track in accordance with a detected output of each reflected light beam, and the read data is sequentially output in the record order by preventing the read data from being duplicated or omitted.

Each of a plurality of light beams of such a multibeam optical disc read apparatus is required to be correctly focussed onto an optical disc signal plane. If not, record data cannot be read with a light beam in an out of focus state. If a focussing optical system is provided for each of a plurality of light beams, it is possible to focus all the light beams onto the optical disc signal plane by independently controlling these focussing optical systems. However, provision of a plurality of focussing optical systems is not practical from both the technical and economical viewpoints. From this reason, a single focussing optical system is generally used. An optical system is associated with aberration. Even if the center of an optical axis is in an in-focus state, a point spaced apart from the center of the optical axis is in an out of focus state. In order to solve this problem, a plurality of light sources for generating a plurality of light beams are disposed in line and adjusted so as to make a light source spaced apart from the optical axis be shifted toward the optical axis.

However, such adjustment is not easy and it is not preferable to use a plurality of light sources (laser diodes) in order to realize a cost effective system. A a plurality of light beams are focussed on a signal plane of an optical disc, the focus states of the light beams are different. Therefore, in order to compensate for the high frequency component attenuation to be caused by the spatial frequency characteristics (MTF) of a detection output of each light beam, a waveshape equalizer circuit is used for raising a gain of the high frequency components of the detection output and suppressing inter-code interference. It is not economical that a plurality of different waveshape equalizer circuits are used for a plurality of light beams.

SUMMARY OF THE INVENTION

In a multibeam optical disc read apparatus of this invention, an optical system including an objective lens applies n light beams at the same time to respective n tracks on a signal plane of an optical disc in an in-focus state near at the signal plane, and signal processing means generates an RF signal for each light beam from a detection output of the light beam reflected from the signal plane, and reads data recorded on the tracks to which the light beams were applied, basing upon the detection output of the light beam, wherein the optical system is set so that the signal plane of the optical disc is positioned-at the middle of respective in-focus points of the n light beams as viewed along an optical axis direction of the objective lens.

It is therefore possible to avoid a poor in-focus state of each of the n light beams relative to the signal plane and to reliably read record data from an optical disc.

According to an embodiment of the invention, grading means diffracts a light beam generated from a single laser diode light source and generates 0 order, +/– first order, . . . , +/– m-th order diffraction light beams. The i-th order diffraction light beams are symmetrical relative to the 0 order diffraction light beam. Therefore, the focus states of the i-th order diffraction light beams are identical and the spatial frequency characteristics are also identical, so that the waveshape equalizer circuits of the same characteristics can be used.

According to an embodiment of the invention, first and second focus control operations are executed by first determining a control amount necessary for focussing the 0 order diffraction light beam onto the signal plane of an optical disc, and then modifying the control amount so that the signal plane of the optical disc is positioned at the middle of the in-focus points of the 0 order, +/– first order, . . . , +/– m-th order diffraction light beams.

BRIEF DESCRIPTION OF THE DRAWINGS

FIG. 8 is a diagram illustrating an example of a data read operation of the multibeam type CD-ROM read apparatus shown in FIG. 1.

FIG. 9 is a diagram illustrating an example of a data read operation of the multibeam type CD-ROM read apparatus shown in FIG. 1.

FIG. 10 is a diagram illustrating an example of the contents of the memory shown in FIG. 3.

FIG. 12 is a diagram illustrating an example of the contents of the memory shown in FIG. 3.

FIG. 16 is a diagram illustrating an example of the contents of the memory shown in FIG. 3.

DETAILED DESCRIPTION OF THE PREFERRED EMBODIMENTS

Figure 1:
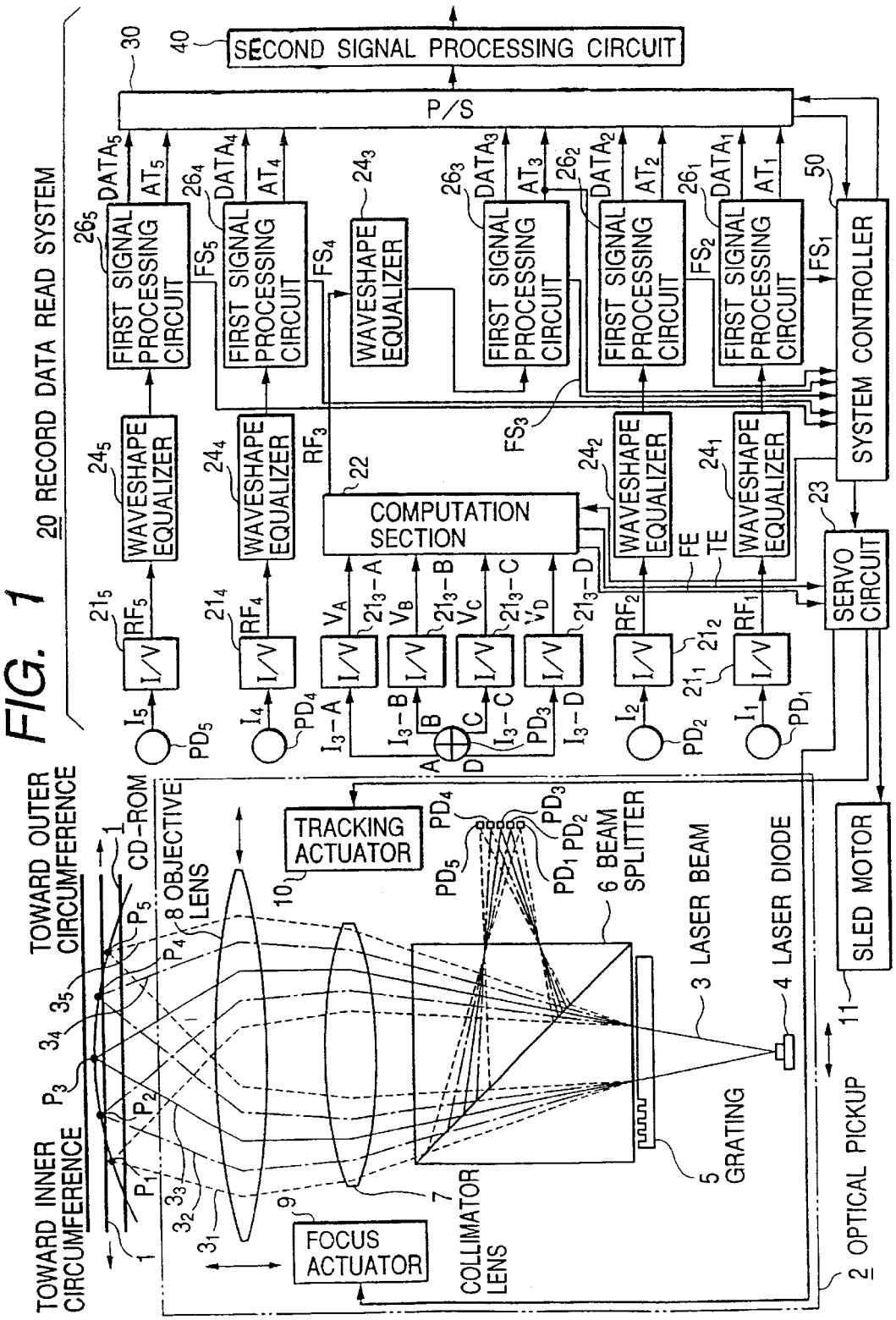
FIG. 1 is a block diagram of a multibeam type CD-ROM read apparatus according to an embodiment of the invention.

Next, an embodiment of a multibeam type CD-ROM read apparatus will be described with reference to FIG. 1. In FIG. 1, reference numeral 1 represents a CD-ROM formed with a spiral track recorded with data (the outer and inner circumference sides of CD-ROM are indicated by arrows in FIG. 1). CD-ROM 1 is rotated at a constant linear velocity with an unrepresented spindle motor. Reference numeral 2 represents an optical pickup of a multibeam type capable of radiating five light beams. The optical pickup 2 moves from an inner circumference to an outer circumference as record data read advances, while CD-ROM 1 rotates. The optical pickup 2 applies different light beams $3_1$ to $3_5$ at the same time to n=5 adjacent tracks of CD-ROM 1, and each reflected light beam is detected.(received) with photodetectors $PD_1$ to $PD_5$ which output photocurrents as detection signals.

In the optical pickup 2, reference numeral 4 represents a laser diode for radiating a laser beam 3, Reference numeral 5 represents a grating (diffraction grating) disposed perpendicular to the optical axis of the laser diode 4 for diffracting the laser beam to form a −2 order diffraction light beam $3_1$, a −1 order diffraction light beam $3_2$, a 0 order diffraction light beam $3_3$, a +1 order diffraction light beam $3_1$ and a +2 order diffraction light beam $3_5$. Reference numeral 6 represents a beam splitter made of two rectangular prisms glued together. Reference numeral 7 represents a collimator lens for converting each diffused light beam into a collimated light beam. Reference numeral 8 represents an objective lens for focussing the light beams $3_1$ to $3_5$ passed through the beam splitter 6 and collimator lens 7 onto a signal plane 1 of CD-ROM 1. The optical axis of the objective lens 8 intersects at a right angle with the signal plane 1.

Reference numeral 9 represents a focus actuator for moving the objective lens 8 along a direction perpendicular to the signal plane 1 of CD-ROM 1 to follow surface vibration of CD-ROM 1, in order to maintain an in-focus state of each light beam $3_1$ to $3_5$ relative to the signal plane 1 irrespective of surface vibrations of CD-ROM 1. Reference numeral 10 represents a tracking actuator for moving the objective lens 8 along a radial direction of the signal plane 1 of CD-ROM 1 to follow a center deviation of CD-ROM 1, in order to make each light beam $3_1$ to $3_5$ correctly trace a corresponding track. The focus actuator 9 and tracking actuator 10 are independently driven by a servo circuit to be described later.

The photodetectors $PD_1$ to $PD_5$ are provided in correspondence with the light beams $3_1$ to $3_5$, and each outputs a photocurrent proportional to a received light amount. The light beams $3_1$, $3_2$, $3_4$, and $3_5$ reflected from the signal plane 1 of CD-ROM 1 pass through the objective lens 8 and collimator lens 7 and are reflected by the beam splitter 6. Thereafter, they pass through an optical system (not shown) including a cylindrical lens, a detector lens and the like and become incident upon the corresponding photodetectors $PD_1$ to $PD_5$.

The optical axis of the optical system constituted of a cylindrical lens, a detector lens and the like is made coincident with the optical axis of the light beam $3_3$ of the 0 order diffraction light, and the light beam is made vertically incident upon the signal plane 1 of CD-ROM 1.

The light beams $3_4$ and $3_2$ ($3_5$ and $3_1$) are the −1 order diffraction light and −1 order diffraction light (+2 order diffraction light and −2 order diffraction light) of the laser beam 3 made vertically incident upon the grating 5, are formed in perfect line symmetry with the light beam $3_3$ of the 0 order diffraction light, and applied to the signal plane 1 in perfect symmetry with the light beam $3_3$ vertically incident upon the signal plane 1 of CD-ROM 1. Therefore, in-focus points $P_4$ and $P_2$ ($P_5$ and $P_1$) of a pair of light beams $3_4$ and $3_2$ ($3_5$ and $3_1$) are at the same position as viewed along the optical axis of the objective lens 8, and in-focus points of the light beams $3_1$ to $3_5$ are generally on an arc line. Therefore, even if the light beam $3_3$ is in a perfect in-focus state relative to the signal plane 1, the other light beams are not in the perfect in-focus state although they are focussed near the signal plane 1.

The photodetectors $PD_1$, $PD_2$, $PD_4$, and $PD_5$ output photocurrents $I_1$, $I_2$, $I_4$, and $I_5$, proportional to received light amounts. The photodetector $PD_3$ is a four-division photodiode similar to that used for an optical pickup of the ordinary one beam type, and outputs photocurrents $I_3$-A, $I_3$-B, $I_3$-C, and $I_3$-D proportional to received light amounts of respective division diodes.

Reference numeral 11 represents a sled motor for moving the optical pickup 2 in the radial direction of CD-ROM 1 during a read or search operation. The sled motor is driven with the servo circuit and moves the optical pickup 2 to a desired position along a forward or reverse direction during the search operation, or gradually moves the optical pickup 2 along the forward direction during the read operation as the read operation of CD-ROM 1 advances.

Reference numeral 20 represents a record data read system which reads at the same time the record data recorded on the tracks applied with the light beams $3_1$ to $3_5$, basing upon the light reception outputs of the photodetectors $P_1$, to $PD_5$ of the optical pickup 2, and serially outputs the read record data in the record order of CD-ROM 1 by preventing the read record data from being duplicated or omitted. A focus bias adjustment at the start of the data read operation is performed once before and after an unreadable system judgement. In the record data read system 20, current/voltage converters (I/V) $21_1$, $21_2$, $21_4$, and $21_5$ convert the photocurrents $I_1$, $I_2$, $I_4$, and $I_5$ output from the photodetectors $PD_1$, $PD_2$, $PD_4$, and $PD_5$ into RF voltage signals $RF_1$, $RF_2$, $RF_4$, and $RF_5$ corresponding to the light beams $3_1$, $3_2$, $3_4$, and $3_5$ and output them. Current/voltage converters (I/V) $21_3$-A, $21_3$-B, $21_3$-C, and $21_3$-D convert the photocurrents $I_3$-A, $I_3$-B, $I_3$-C and $I_3$-D output from the photodetector $PD_3$ into voltage values $V_A$, $V_B$, $V_C$, and $V_D$ and output them.

Figure 2:
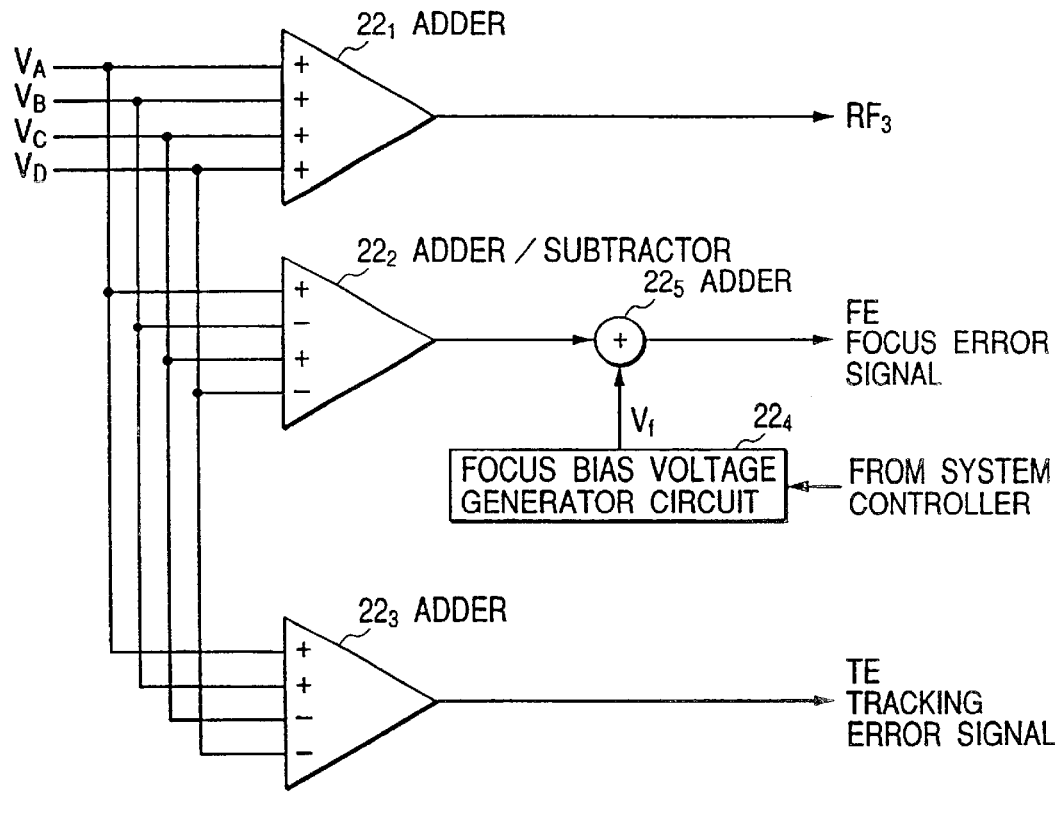
FIG. 2 is a block diagram showing the structure of a computation section shown in FIG. 1.

Reference numeral 22 represents a computation section which performs an arithmetic operation of $(V_A+V_B+V_C+V_D)$ to output an RF signal $RF_3$ corresponding to the light beam $3_3$, an arithmetic operation of $(V_A+V_C)-(V_B+V_D)$ to output a focus error signal, and an arithmetic operation of $(V_A+V_B)-(V_C+V_D)$ to output a tracking error signal. A specific structure of the computation section 22 is shown in FIG. 2. In the computation section, an adder $22_1$ performs an arithmetic operation of $(V_A+V_B+V_C+V_D)$ to output the RF signal $RF_3$ corresponding to the light beam $3_3$. An adder/subtractor $22_2$ performs the arithmetic operation of $(V_A+V_B)-(V_B+V_D)$ to output the focus error signal, and an adder/subtractor $22_3$ performs the arithmetic operation of $(V_A+V_B)-(V_C+V_D)$ to output the tracking error signal.

Reference numeral 23 represents the servo circuit for performing a focus servo control, a tracking servo control, and a sled servo control. In accordance with the focus error signal FE input from the computation section 22, the focus actuator 9 is driven so as to make FE zero and focus the light beams $3_1$ to $3_5$ upon the signal plane 1, and in accordance with the tracking error signal input from the computation section 22, the tracking actuator 10 is driven to make TE zero and make (on-track) the light beams $3_1$ to $3_5$ trace the corresponding tracks.

Because of variation of optical characteristics of the optical pickup 2 and variation of electrical characteristics of the current/voltage converters $21_3$-A to $21_3$-D and the adder/subtractor $22_2$, the focus error signal output from the adder/subtractor $22_2$ does not become zero but has an offset value specific to the apparatus, even if the light beam $3_3$ is in a perfect in-focus state relative to the signal plane 1 of CD-ROM 1. The focus servo system controls to make zero the focus error signal FE input from the servo circuit 23. Therefore, if the focus error signal output from the adder/subtractor $22_2$ is supplied directly to the servo circuit 23, the light beam $3_3$ does not enter the in-focus state relative to the signal plane 1 because of the offset value. An error rate of data read from CD-ROM 1 may become too large and data read becomes impossible in some cases.

To solve this problem, an offset adjustment function has been supplied to the focus servo system. Specifically, the computation section 22 is provided with a focus bias voltage generator circuit $22_4$ for generating a variable focus bias voltage $V_f$ under the control of a system controller to be described later, and an adder $22_5$ for adding the focus bias voltage Vf to the focus error signal output from the adder/subtractor $22_2$ to form the focus error signal FE. By supplying the focus bias voltage $V_f$ suitable for each apparatus to the focus bias system, offset errors of the optical system and electrical system are cancelled out to make the light beam $3_3$ be focussed on the signal plane 1.

Reverting to FIG. 1, reference numerals $24_1$ to $24_5$ represent waveshape equalizers for increasing the high frequency components of the RF signals $RF_1$ to $RF_5$ to thereby compensate for high frequency attenuation to be caused by the spatial transmission frequency (MTF) characteristics of the light beams $3_1$ to $3_5$ and suppress the generation of inter-code interference. The RF signal $RF_3$ input to the waveshape equalizer $24_3$ or the RF signal $RF_3$ output from the waveshape equalizer $24_3$ is input to the servo circuit 23. The servo circuit 23 activates the focus servo control upon judgement of a timing when the value of the focus error signal FE enters a negative feedback region of the focus servo control during a focus search operation. The servo circuit 23 activates the tracking servo control upon judgement of a timing, by using the RF signal $RF_3$, when the light beam $3_3$ enters the negative region of the tracking servo control.

Reference numerals $26_1$ to $26_5$ represent first signal processing circuits for performing binarization, clock recovery using PLL circuits, bit demodulation, frame sync detection, EFM demodulation, and sub-code demodulation, by using the RF signals $RF_1$ to $RF_5$, and outputting data $DATA_1$ to $DATA_5$ (inclusive of P, Q parities) after the EFM demodulation on the basis of one block unit (unit of 98 frames completing one sub-code frame), together with corresponding A-time (Absolute-time) data $AT_1$ to $AT_5$ of the sub-code Q channel. The first signal processing circuits $26_1$ to $26_6$ serially output the demodulated data $DATA_1$ to $DATA_5$ one symbol (8 bits) after another. The A-time data $AT_3$ output from the first signal processing circuit $26_3$ is input to a system controller to be described later. The first signal processing circuit $26_3$ for the RF signal $RF_3$ has a built-in CLV control circuit (not shown) for making frame sync signals be detected at a constant time interval. A CLV control is performed for an unrepresented spindle motor to thereby rotate CD-ROM 1 at a constant linear velocity.

Upon detection of the frame sync, the first signal processing circuits $26_1$ to $26_5$ output frame sync detection signals $FS_1$ to $FS_5$ of H level to the system controller. For example, these frame sync detection signals $FS_1$ to $FS_5$ are used for judging whether a track jump is completed or not. The first signal processing circuit $26_3$ has a built-in jitter amount measuring circuit (not shown) for measuring a jitter amount of the binarized RF signal, and has a function of outputting the measured jitter amount data $JD_3$ to the system controller. The jitter amount data $JD_3$ input from the first signal processing circuit $26_3$ is used for focus bias adjustment.

Figure 3:
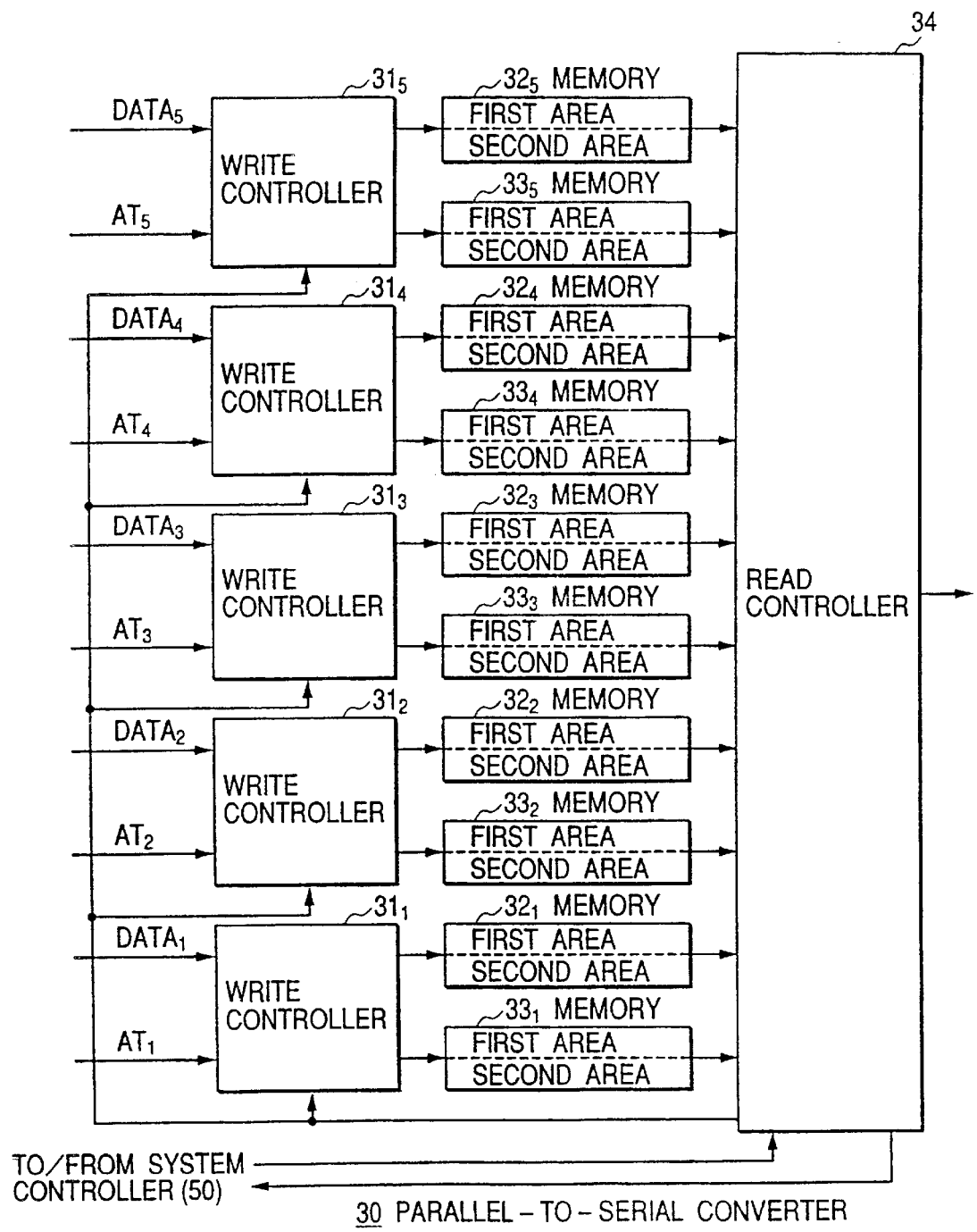
FIG. 3 is a block diagram showing the structure of a parallel-to-serial converter shown in FIG. 1.

Reference numeral 30 represents a parallel-to-serial converter (P/S) for receiving in parallel data of one block unit output from the first signal processing circuits $28_1$ to $28_5$ and serially outputting them in the record order by preventing the data from being duplicated or omitted. The specific structure of the P/S converter 30 is shown in FIG. 3 In FIG. 3 reference numerals $32_1$ to $32_5$ represent memories each having two storage areas, a first area and a second area, and provided in correspondence with a corresponding one of the first signal processing circuits $26_1$, to $26_5$. The data $DATA_1$ to $DATA_5$ output from the first signal processing circuits $26_1$ to $26_5$ are stored in ones of the first and second areas. Each of the first and second areas has a capacity allowing the data $DATA_1$, to $DATA_5$ of a sufficient number of block units to be stored therein. Reference numerals $33_1$, to $33_5$ represent memories each having two storage areas, a first area and a second area, and provided in correspondence with a corresponding one of the first signal processing circuits $26_1$, to $26_5$. The A-time data $AT_1$, to $AT_5$ output from the first signal processing circuits $26_1$ to $26_5$ are stored in ones of the first and second areas, together with start addresses $A_{1S}$, to $A_{5S}$ (or $a_{1S}$ to $a_{5S}$) and end addresses $A_{1e}$ to $A_{5e}$ (or $a_{1e}$ to $a_{5e}$) indicating the location of the corresponding data $DATA_1$ to $DATA_5$ in the memories $32_1$ to $32_5$. Each of the first and second areas has a capacity allowing the A-time data $AT_1$ to $AT_5$ of a sufficient number of data sets to be stored therein.

Reference numerals $31_1$ to $31_5$ represent write controllers provided in correspondence with the first signal processing circuits $26_1$ to $26_5$. The write controllers $31_1$ to $31_5$ control to write the data $DATA_1$ to $DATA_5$ output from the first signal processing circuits $26_1$ to $26_5$ in the first or second areas of the memories $32_1$ to $32_5$, and to write the A-time data $AT_1$ to $AT_5$ in the first or second areas of the memories $32_1$ to $32_5$, together with the start addresses $A_{1s}$ to $A_{5s}$ (or $a_{1s}$ to $a_{5s}$) and end addresses $A_{1e}$ to $A_{5e}$ (or $a_{1e}$ to $a_{5e}$) indicating the location of the corresponding data $DATA_1$ to $DATA_5$ in the memories $32_1$ to $32_5$.

Figure 4:
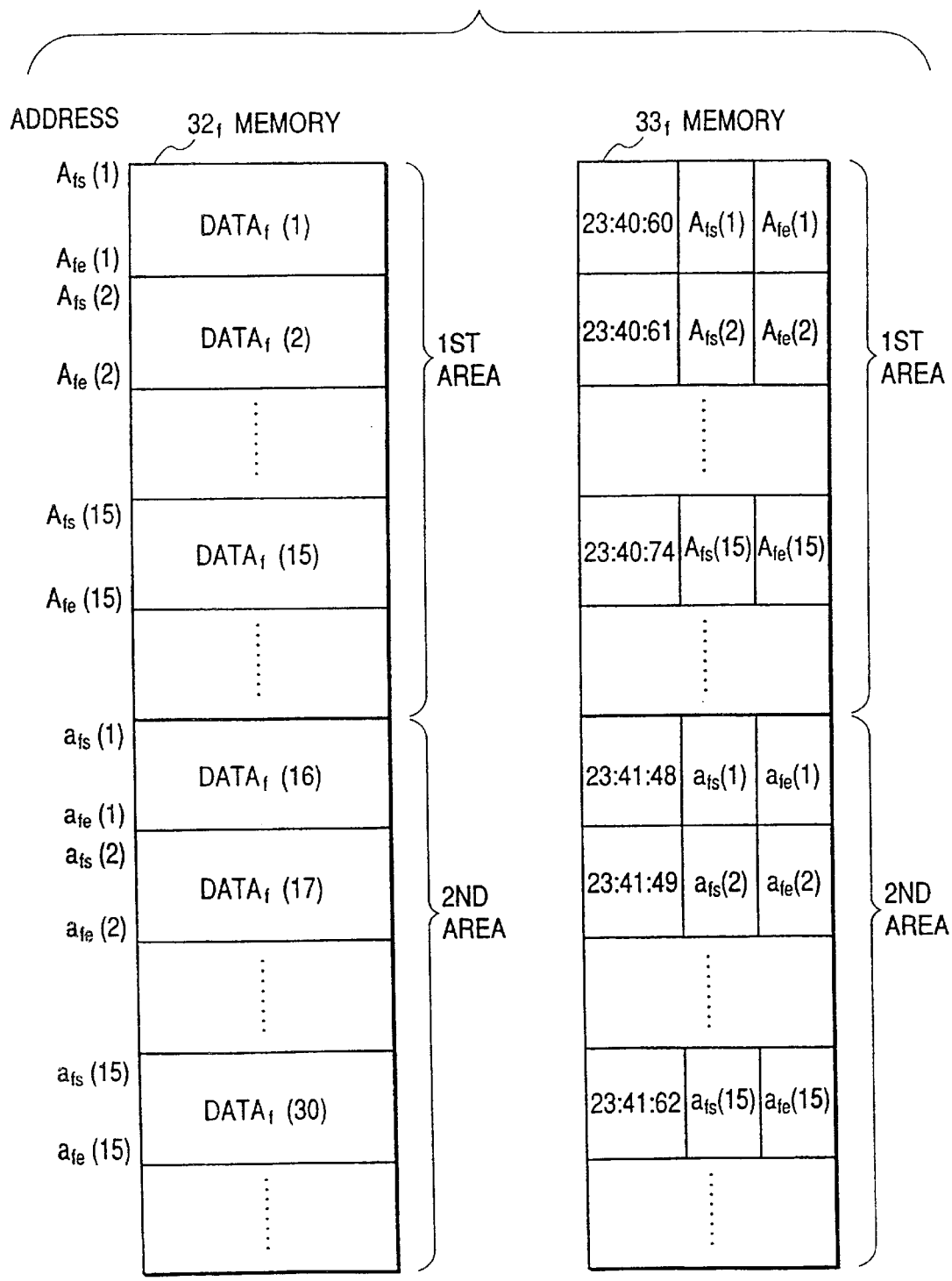
FIG. 4 is a diagram illustrating an example of the contents of a memory shown in FIG. 3.

The contents of memories $32_f$ and $33_f$ (where f=1 to 5) are shown in FIG. 4. In this example, a write controller $31_f$ controls to write 15 blocks of each set of data $DATA_f(1)$ to $DATA_f(15)$ in the first area, and to write 15 blocks of each set of data $DATA_f(16)$ to $DATA_f(30)$ in the second area. In the first area of the memory $33_f$, the A-time data for each block of the data $DATA_f(1)$ to $DATA_f(15)$ are written as, for example, frames of 23:40:60 to 23:40:74, together with a start address $A_{fs}(1)$ and an end address $A_{fe}(1)$ to a start address $A_{fs}(15)$ and an end address $A_{fe}(15)$ indicating the location of the corresponding data $DATA_f(1)$ to $DATA_f(15)$ in the first area of the memory $32_f$. In the second area of the memory $33_f$, the A-time data for each block of the data $DATA_f(16)$ to $DATA_f(30)$ are written as, for example, frames of 23:41:48 to 23:41:62, together with a start address $a_{fs}(1)$ and an end address $a_{fe}(1)$ to a start address $a_{fs}(16)$ and an end address $a_{fe}(15)$ indicating the location of the corresponding data $DATA_f(16)$ to $DATA_f(30)$ in the second area of the memory $32_f$.

Reference numeral 34 represents a read controller. With reference to the A-time data and the start addresses $A_{1s}$ to $A_{5e}$ (or $a_{1s}$ to $a_{5s}$) and end addresses $A_{1e}$ to $A_{5e}$ (or $a_{1e}$ to $a_{5e}$) stored in the memories $33_1$ to $33_5$, the read controller 34 reads the data $DATA_1$ to $DATA_5$ stored in the memories $33_1$ to $33_5$ by preventing the data from being duplicated or omitted, and serially outputs the data one symbol after another in the record order (A-time -order) of CD-ROM 1. Specific operations of the write controllers $31_1$ to $31_5$ and read controller 34 will be later described.

Returning back to FIG. 1, reference numeral 40 represents a second signal processing circuit. The second signal processing circuit 40 receives the data serially output from the P/S converter 30, descrambles the data in the unit of one block, and thereafter demodulates Lch and Rch data in conformity with the CD-DA specification through error detection/correction based on CIRC codes (error detection/correction with P parities, deinterleaveing, error detection/correction with Q parities). The second signal processing circuit 40 then demodulates the CD-ROM data from the Lch and Rch data by performing sync detection, descrambling, header detection, and error detection/correction with EDC and ECC codes in accordance with the CD-ROM specification, and thereafter outputs the CD-ROM data to an external host computer.

Reference numeral 50 represents a system controller made of a microcomputer. For the search operation, the system controller 50 operates to supply a search command to the servo circuit 23, and to drive the sled motor 11 for the search operation to thereby move the optical picku 2 along the f6rward or reverse direction of CD-ROM 1 to a desired position. For the read operation, the system controller 50 operates to supply various servo-on commands to the servo circuit 23, and to focus the light beams $3_1$ to $3_5$ upon the signal plane 1 of CD-ROM 1 to thereby trace adjacent five tracks. Each time record data is read from each track during a proper number of rotations of one or two or more, the system controller 50 supplies the servo circuit 23 with a track jump command of jumping the optical pickup by a predetermined number of tracks in the forward direction.

At the start of a read operation, the system controller 50 monitors the jitter amount data $JD_3$ input from the first signal processing circuit $26_3$ to control the focus bias voltage generator circuit $22_4$ and change the focus bias voltage $V_f$ and fix the $V_f$ value when the jitter amount data becomes minimum, or monitors the frame sync detection signals $FS_1$ to $FS_5$ input from the first signal processing circuits $26_1$ to $26_5$, during one rotation of CD-ROM 1, to check whether or not any system of the light beams $3_1$ to $3_5$ cannot read record data because of a track pitch variation, center deviation and the like of CD-ROM 1. If all the frame sync detection signals $FS_1$ to $FS_5$ are H and there is no system unable to read record data, the system controller supplies a general read/write command to the P/S converter 30 to thereby read/write data output from the first signal processing circuit $26_1$ to $26_5$ to and from the memories $32_1$ to $32_5$.

If the frame sync detection signal for one or a plurality of light beams is L for a predetermined time (e.g., ⅟₇₅ sec or longer) and data cannot be read, light beams $3_i$, $3_j$, $3_k$, ... to be used for the data read are selected from the light beams $3_1$ to $3_5$, and a specific read/write command including read system information "i, j, k, ..." indicating the light beam systems to be used for the data read is supplied to the P/S converter 30 to thereby read/write data $DATA_i$, $DATA_j$, $DATA_k$, ... output from the first signal processing circuit $26_i$, $26_j$, $26_k$, ... among the first signal processing circuits $26_1$ to $26_5$ to and from the memories $32_1$ to $32_5$.

The general read/write command or specific read/write command output from the system controller 50 is input to the read controller 34 of the P/S converter 30 and transferred from the read converter 34 to the write controllers $31_1$ to $31_5$. Upon reception of the general read/write command at the start of the data read, the write controllers $3_1$ to $31_5$ control to write the data $DATA_1$ to $DATA_5$ output from all the first signal processing circuits $26_1$ to $26_5$ first in the first areas of the memories $32_1$ to $32_5$. Upon reception of an intercept command from the read controller 34, the read operation is intercepted until a resume command is received, and then the data is written in the second areas. Similarly, when the intercept command is received thereafter, the read operation is intercepted, and when the resume command is received, data is written in the areas not used at the preceding time.

If the write controllers $31_1$ to $31_5$ receive the specific read/write command at the start of the data read, only the write controllers $31_i$, $31_j$, $31_k$, ... indicated by the read system information "i, j, k, ..." operate to write the data $DATA_i$, $DATA_j$, $DATA_k$, ... output from the first signal processing circuits $26_i$, $26_j$, $26_k$, ... first in the first areas of the memories $32_i$, $32_j$, $32_k$, ... Upon reception of the intercept command from the read controller 34, the read operation is intercepted until the resume command is received, and then the data is written in the second areas. Similarly, when the intercept command is received thereafter, the read operation is intercepted, and when the resume command is received, data is written in the areas not used at the preceding read cycle.

After receiving the general read/write command (specific read/write command) from the system controller 50, the read controller 34 supplies the intercept command to the write controllers $31_1$ to $31_5$ ($31_i$, $31_j$, $31_k$, ...) and a jump command to the system controller 50, when all A-time data become continuous without omission in the areas among the memories $33_1$ to $33_5$ ($33_i$, $33_j$, $33_k$, ...) where dalta were written by the write controllers $31_1$ to $31_5$ ($31_i$, $31_j$, $31_k$, ... at the present read cycle. With reference to the A-time data and the start and end addresses stored in the areas among the memories $33_1$ to $33_5$ ($33_i$, $33_j$, $33_k$, ...) where data were written at the present read cycle, the read controller 34 controls to read and output record data in the order of A-time starting from the oldest A-time, relative to the data stored in the areas among the memories $33_1$ to $33_5$ ($33_i$, $33_j$, $33_k$, . . . ) where data were written at the present read cycle.

Thereafter, upon reception of a jump completion notice from the system controller 50, the read controller 34 supplies the resume command to the write controllers $31_1$ to $31_5$ ($31_i$, $31_j$, $31_k$, . . . ). Thereafter, the read controller 34 supplies the intercept command to the write controllers $31_1$ to $31_5$ ($31_i$, $31_j$, $31_k$, . . . ) and the jump command to the system controller 50, when all A-time data become continuous without omission in the areas among the memories $33_1$ to $33_5$ ($33_i$, $33_j$, $33_k$, . . . ) not used at the preceding read cycle. With reference to the A-time data and the start and end addresses stored in the areas among the memories $33_1$ to $33_5$ ($33_i$, $33_j$, $33_k$, . . . ) not used at the preceding read cycle, the read controller 34 controls to read and output record data in the order of A-time starting from the A-time next to the A-time corresponding to the one block data lastly output to the second signal processing circuit at the preceding read cycle, relative to the data stored in the areas among the memories $32_1$ to $32_5$ ($32_i$, $32_j$, $32_k$, . . . ) not used at the preceding read cycle. Similar operations are repeated thereafter.

Figure 5:
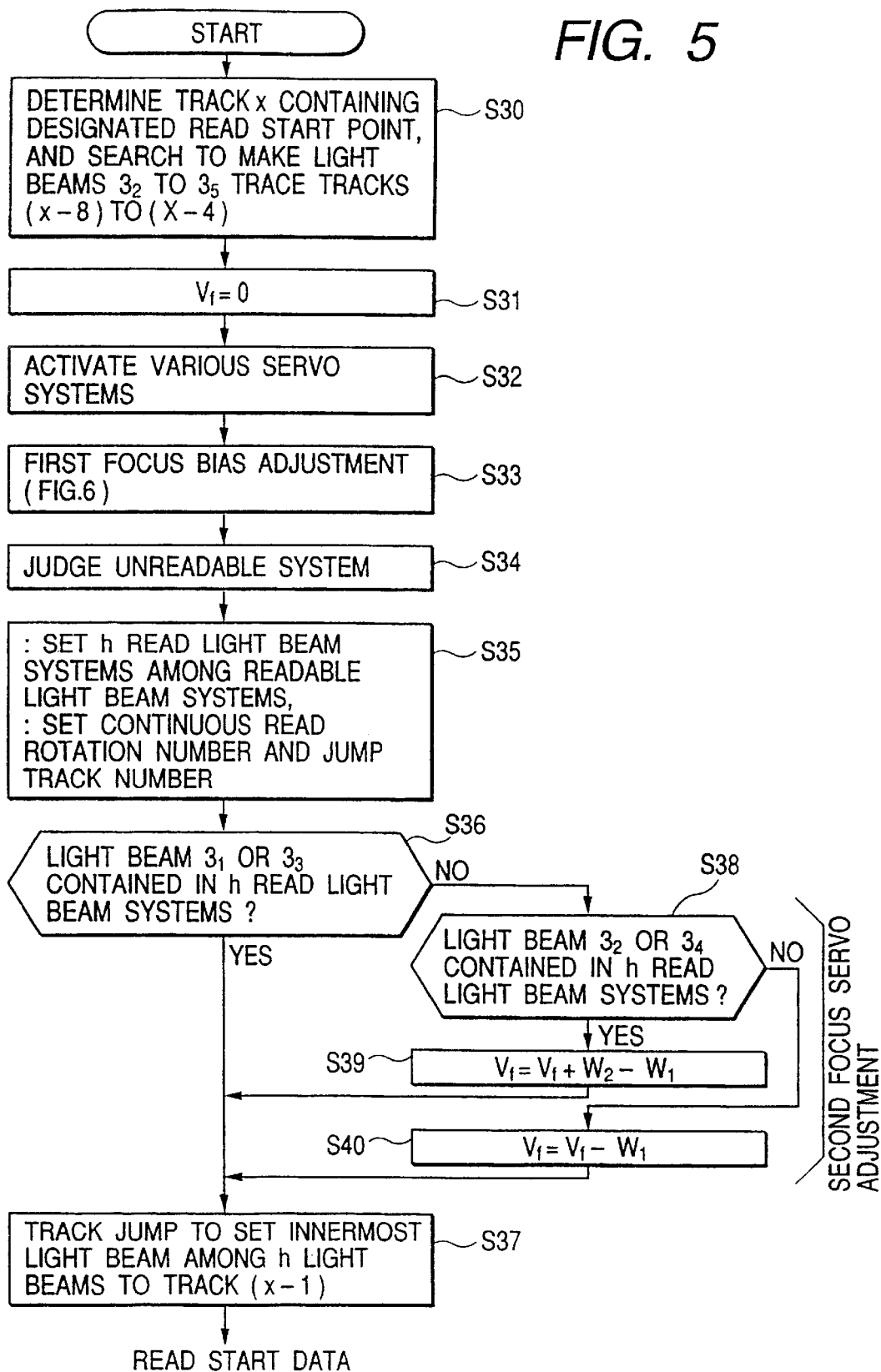
FIG. 5 is a flow chart illustrating a read start control process to be executed by a system controller shown in FIG. 1.
Figure 6:
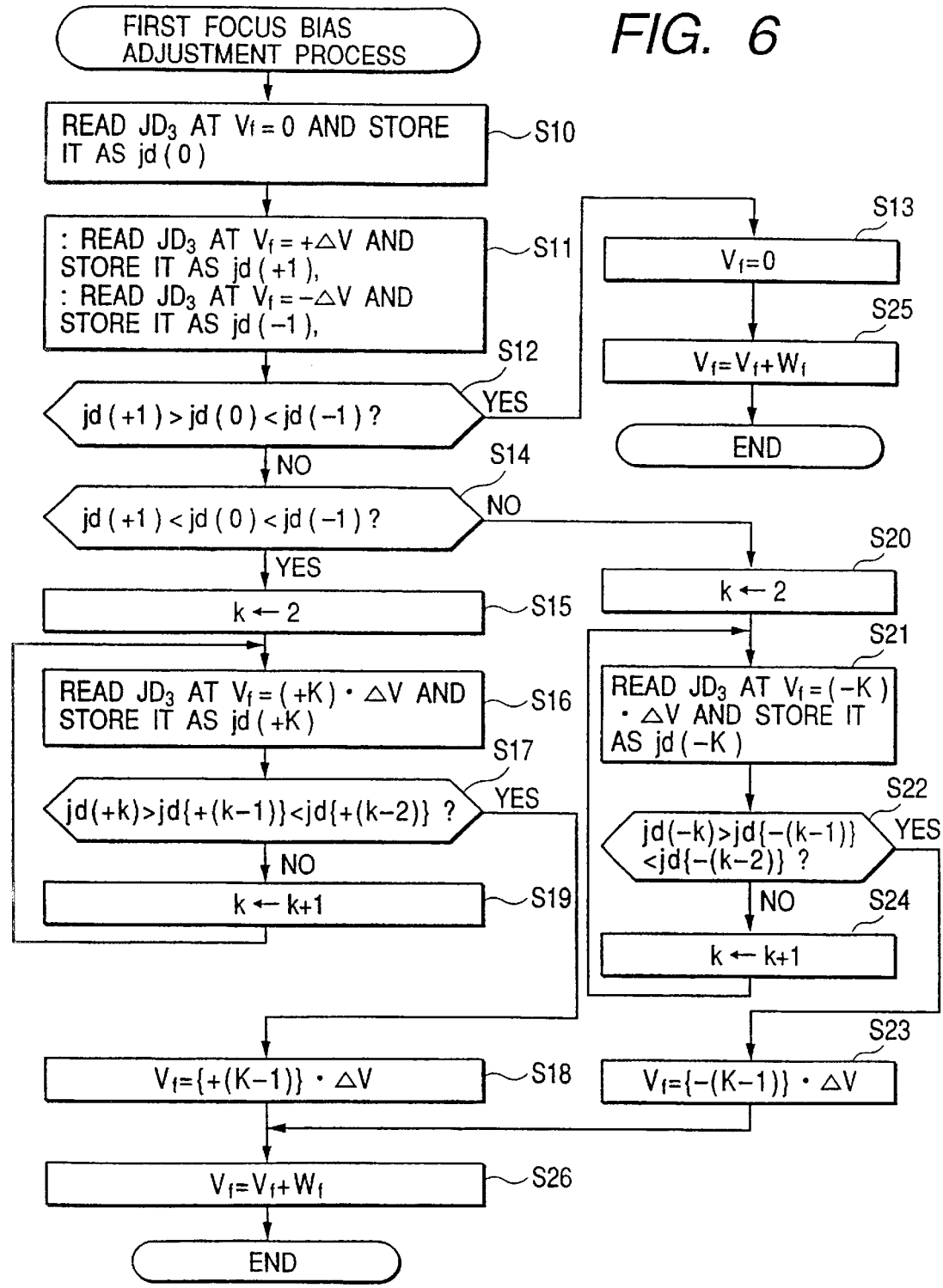
FIG. 6 is a flow chart illustrating a first focus bias adjustment process shown in FIG. 5.

The operation of the embodiment will be described. FIG. 5 is a flow chart illustrating the overall process to be executed by the system controller 50 at the start of data read, FIG. 6 is a flow chart illustrating a first focus bias adjustment process to the executed by the system controller 50, FIGS. 7(1) to 7(3) are diagrams illustrating a focus bias adjustment operation, FIGS. 8, 9, 11, 13, 14, 15, 17, 18, 19, and 21 are diagrams illustrating motion positions of the optical pickup 2 relative to CD-ROM 1, and FIGS. 10, 12, 16, and 20 are diagrams showing the data contents in the memories $33_1$ to $33_5$.

It is herein assumed that CD-ROM 1 rotates at a constant linear velocity under CLV control and the focus servo is turned on, and that different five light beams $3_1$ to $3_5$ are applied at the same time to respective n=5 adjacent tracks of CD-ROM 1.

(1) First Focus Bias Adjustment

When an unrepresented host computer designates a read start point of CD-ROM 1 as a frame having A-time, for example, 23:41:0, the system controller 50 determines the position of the track containing the read start A-time frame of CD-ROM 1, the read start point being represented by x (refer to FIGS. 8, 9, 11, 13–1e, 17–19, and 21). The system controller 50 first supplies the search command to the servo circuit 23 to move the optical pickup 2 so that the light beam $3_1$ reaches the position of the track (x–8) (Step S30 shown in FIG. 5). Thereafter, the focus bias voltage generator circuit $22_4$ is controlled to initialize $V_f$ as $V_f$=0 V (Step S31). Thereafter, the system controller 50 supplies a tracking servo-on command and a sled servo-on command to the servo circuit 23 to activate the tracking servo and sled servo (Step S32). Therefore, the light beams $3_1$ to $3_5$ radiated from the optical pickup 2 are focussed on the tracks (x–8) to (x–4) in an track-on state (refer to I in FIGS. 8, 9, 11, 13–15, 17–19, and 21). In this state, all the light beams $3_1$ to $3_5$ are not in an optimum in-focus state because the focus bias adjustment is not still performed.

The light beams $3_1$ to $3_5$ reflected by the signal plane 1 are received by the photodetectors $PD_1$ to $PD_5$ which output photocurrents $I_1$ to $I_5$. Of these photocurrents, the photocurrents $I_1$, $I_2$, $I_4$, and $I_5$ output from the photodetectors $PD_1$, $PD_2$, $PD_4$, and $PD_5$ are converted into RF signals $RF_1$, $RF_2$, $RF_4$, and $RF_5$ by the current-to-voltage converters $21_1$, $21_2$, $21_4$, and $21_5$ which are waveshape equalized by the waveshape equalizers $24_1$, $24_2$, $24_4$, and $24_5$ and input to the first signal processing circuits $26_1$, $26_2$, $26_4$, and $26_5$. Photocurrents $I_3$-A to $I_3$-D from the photodetector $PD_3$ are converted into voltage values $V_A$ to $V_D$ by the current-to-voltage converters $21_3$-A to $21_3$-D and added together by the adder $22_1$ of the computation section 22 to generate an RF signal $RF_3$. The RF signal $RF_3$ is waveshape equalized by the waveshape equalizer $24_3$ and input to the first signal processing circuit $26_3$.

The optical axis of the optical system constituted of the beam splitter 6, collimator lens 7, objective lens 8, cylindrical lens, a detector lens and the like is made coincident with the optical axis of the light beam $3_3$ Of the 0 order diffraction light, and the light beam is made vertically incident upon the signal plane 1 of CD-ROM 1. When the light beam $3_3$ is in the perfect in-focus state relative -to the signal plane 1, the in-focuspi points of the other light beams $3_1$, $3_2$, $3_4$, and $3_5$ are not in the perfect in-focus state although they are near the signal plane 1.

The light beams $3_4$ and $3_2$ ($3_5$ and $3_1$) are the+1 order diffraction light and–1 order diffraction light (+2 order diffraction light and–2 order diffraction light) of the laser beam 3 made vertically incident upon the grating 5, are formed in perfect line symmetry with the light beam $3_3$ of the 0 order diffraction light, and applied to the signal plane 1 in perfect symmetry with the light beam $3_3$ vertically incident upon the signal plane 1 of CD-ROM 1. Therefore, a pair of light beams $3_4$ and $3_2$ ($3_5$ and $3_1$) has the same cross sectional area on the signal plane and the same spatial transmission frequency characteristics.

The waveshape equalizers $24_1$ to $24_5$ increase the high frequency components of the RF signals $RF_1$ to $RF_5$ to thereby compensate for high frequency attenuation to be caused by the spatial transmission frequency (MTF) characteristics of the light beams $3_1$ to $3_5$ and suppress the generation of inter-code interference. As described above, since the light beams $3_1$ and $3_5$ have the same spatial transmission frequency characteristics (MTF), the waveshape equalizers $24_1$ and $24_5$ are made to have the same waveshape equalizing characteristics. Similarly, since the light beams $3_2$ and $3_4$ have the same spatial transmission frequency characteristics (MTF), the waveshape equalizers $24_2$ and $24_4$ are made to have the same waveshape equalizing characteristics. Therefore, three types of waveshape equalizing characteristics are designed for the five waveshape equalizer circuits $24_1$, to $24_5$.

The first signal processing circuits $26_1$ to $26_5$ make the input RF signals $RF_1$ to $RF_5$ be subjected to binarization, clock recovery using PLL circuits, bit demodulation, frame sync detection, EFM demodulation, and sub-code demodulation, and output data $DATA_1$ to $DATA_5$ (inclusive of P, Q parities) after the EFM demodulation on the basis of one block unit, together with corresponding A-time data $AT_1$ to $AT_5$ of the sub-code Q channel. The first signal processing circuits $26_1$ to $26_6$ serially output the demodulated data $DATA_1$ to $DATA_5$ one symbol (8 bits) after another. The A-time data $AT_3$ is input to the system controller 50. Upon detection of the frame sync signals, the first signal processing circuits $26_1$ to $26_6$ output the frame sync detection signals $FS_1$ to $FS_6$ of H level to the system controller 50. The first signal processing circuit $26_3$ measures a jitter amount of the binarized RF signal and supplies the jitter amount data $JD_3$ to the system controller.

In this state, the system controller 50 executes a first focus bias adjustment process during approximately one rotation of CD-ROM 1 (Step S33) in accordance with the sequence shown in the flow chart of FIG. 6. At $V_f=0$ V, the system controller 50 reads the jitter amount data $JD_3$ measured by the first signal processing circuit 263 and stores it in its memory (not shown) as jd(0) (Step S10). Next, the focus bias voltage generator circuit $22_4$ is controlled to increase $V_f$ by ΔA(positive value) from 0 V and the jitter amount data $JD_3$ is read and stored in the memory as jd(+1). The voltage $V_f$ is decreased by ΔA(negative value) from 0 V and the jitter amount data $JD_3$ is read and stored in the memory as jd(−1) (Step S11).

The values jd(+1), jd(0), and jd(−1) are compared and if jd(+1)>jd(0)<jd(−1) (YES at Step S12), the jitter amount is minimum at $V_f=0$ V and it can be considered that the focus offset was initially and approximately 0. Therefore, the focus bias voltage generator circuit $22_4$ is controlled to set $V_f$ to 0 V (Step S13).

If jd(+1)<jd(0)<jd(−1) (YES at Step S14), it is set that k=2 (Step S15) and $V_f=(+2)\cdot\Delta V$, and the jitter amount $JD_3$ is read and stored as jd(+2) (Step S16). If jd(+2)>jd(+1)<jd(0) (YES at Step S17), the jitter amount is minimum at $V_f=(+1)\cdot\Delta V$, and it can be considered that the focus offset at the output of the adder/subtractor $22_2$ was initially and approximately (+1)·(−ΔV). Therefore, the focus bias voltage generator circuit $22_4$ is controlled to set $V_f$ to (+1, ΔV (Step S18).

If not jd(+2)>jd(+1)<jd(0) (NO at Step S17), the value k is incremented to 3 (Step S19), and the flow returns to Step S16 to repeat the above operations. If jd(+k)>jd{+(k−1)}<jd{+(k−2)}(YES at Step S17), the jitter amount is minimum at $V_f=\{+(k-1)\}\cdot(\Delta V)$, and it can be considered that the focus offset was initially and approximately {+(k−1)}·(−ΔV). Therefore, the focus bias voltage generator circuit $22_4$ is controlled to set $V_f$ to {+(k−1)}·ΔV (Step S18).

If not jd(+1)<jd(0)<jd(−1) at Step S14, the value k is set to 2 (Step S20). $V_f$ is set to (−2)·ΔV and the jitter amount $JD_3$ is read and stored as jd(−2) (Step S21). If jd(−2)>jd(−1) <jd(0) (YES at Step S22), the jitter amount is minimum at $V_f=(-1)\cdot\Delta V$, and it can be considered that the focus offset at the output of the adder/subtractor $22_2$ was initially and approximately (−1)·(−ΔAV). Therefore, the focus bias voltage generator circuit $22_4$ is controlled to set $V_f$ to (−1)·ΔV (Step S23).

If not jd(−2)>jd(−1)<jd(0) (NO at Step S22), the value k is incremented to 3 (Step S24) to repeat the above operations. If jd(−k) >jd{−(k−1)}<jd{−(k−2)}(YES at Step S22), the jitter amount is minimum at $V_f=\{-(k-1)\}\cdot(\Delta V)$, and it can be considered that the focus offset at the output of the adder/subtractor $22_2$ was initially and approximately {−(k−1)}·(−ΔV). Therefore, the focus bias voltage generator circuit $22_4$ is controlled to set $V_f$ to {−(k−1)}·(ΔV) (Step S23).

Figure 7A:
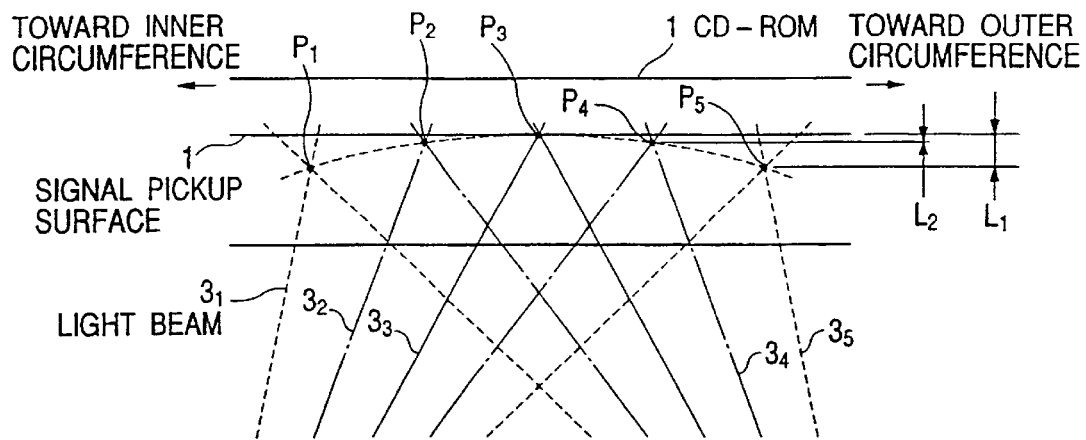
FIGS. 7(1) to 7(3) are diagrams illustrating a focus bias adjustment operation to be executed by the apparatus shown in FIG. 1.

In this focus bias adjustment set state, only the light beam $3_3$ is in the perfect in-focus state relative to the signal plane 1 (in FIG. 7(l), the in-focus point $P_3$ of the light beam $3_3$ is coincident with the signal plane 1), and the other light beams $3_1$, $3_2$, $3_4$, and $3_5$ are not in the perfect in-focus state and the in-focus points $P_1$ and $P_5$ at the outermost circumference are greatly spaced from the signal plane.

Figure 7B:
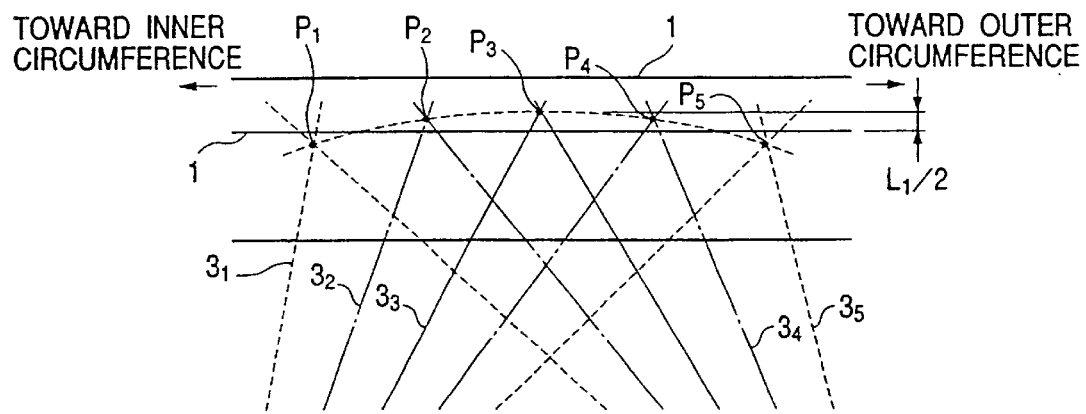
Figure 7C:
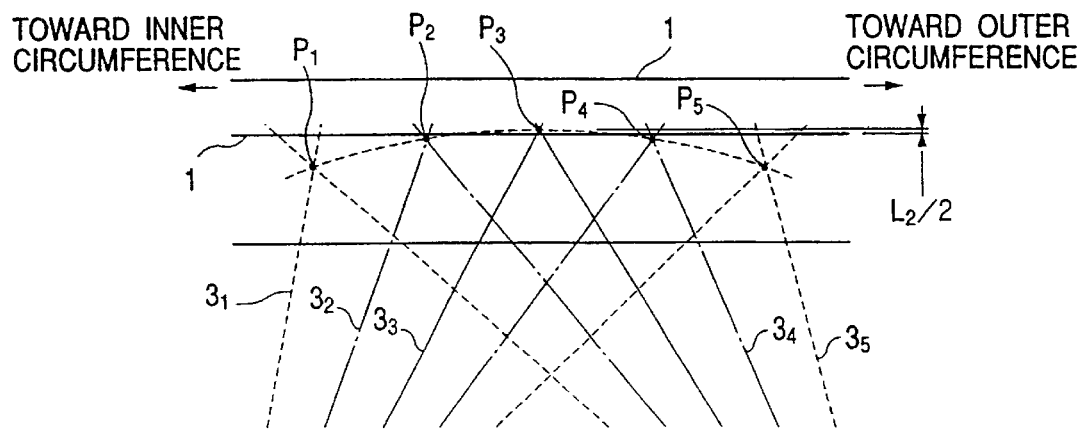

According to the invention, after Step S13, S18 or S23, the focus bias voltage generator circuit $22_4$ is controlled to change the value $V_f$ by a predetermined amount $W_1$ to move the objective lens 8 by $L_1/2$ remotely from the signal plane, where $L_1$ is a distance (refer to FIG. 7(1)) between the in-focus point $P_3$ of the light beam $3_3$ and the in-focus point $P_1$ ($P_5$) of the light beam $3_1$ ($3_5$) along an optical axis direction of the objective lens 8. Namely, at Step S25 or S26, $V_f$ is set to $V_f+W_1$. The signal plane 1 of CD-ROM is therefore positioned at the middle of the in-focus point $P_3$ of the light beam $3_3$ and the in-focus point $P_1$ ($P_5$) of the light beam $3_1$ ($3_5$) (refer to FIG. 7(2)), and all the in-focus points $P_1$ to $P_5$ are near at the signal plane 1 and are not greatly spaced from the signal plane 1.

After Step S13, S18 or S23, the focus bias voltage generator circuit $22_4$ may be controlled to change the value $V_f$ by a predetermined amount $W_2$ to move the objective lens 8 by $L_2/2$ remotely from the signal plane, where $L_2$ is a distance (refer to FIG. 7(1)) between the in-focus point $P_3$ of the light beam $3_3$ and the in-focus point $P_2$ ($P_4$) of the light beam $3_2$ ($3_4$) along an optical axis direction of the objective lens 8. The signal plane 1 of CD-ROM is therefore positioned at the middle of the in-focus point $P_3$ of the light beam $3_3$ and the in-focus point $P_2$ ($P_4$) of the light beam $3_2$ ($3_4$) (refer to FIG. 7(3)). As will be later described, this operation is performed (Steps S38 and S39) during a second focus bias adjustment if the light beam systems $3_1$ and $3_5$ are unreadable.

(2) Judgement of System Unable to Read

After the system controller 50 performs the first focus adjustment at Step S32 shown in FIG. 5 to set the positional relation of the in-focus points $P_1$ to $P_5$ of the light beams $3_1$ to $3_5$ as shown in FIG. 7(2), the system controller 50 monitors the frame sync detection signals $FS_1$ to $FS_5$ input from the first signal processing circuits $26_1$ to $26_5$, during further one rotation of CD-ROM 1, to check whether or not any system of the light beams $3_1$ to $3_5$ continues to take L level for a predetermined time or longer (e.g., one block–⅟₇₅ second or longer) and cannot read record data (Steps S34 to S36).

(3) General Read/write Operation (Refer to FIG. 8, all Systems of the Light beams $3_1$ to $3_5$ can Read Record Data).

If the judgement of a presence/absence of a record data unreadable system shows that there is no record data unreadable system, the system controller 50 allocates all the five light beams $3_1$ to $3_5$ as the read systems of h light beams. A continuous read rotation number I is set as I=1, and a read track jump number J is set as J=(n−2)=3 (Step S35). The second focus bias adjustment shown in FIG. 5 is executed to check whether the light beam $3_1$ or $3_5$ is included in the h=5 read light beams $3_1$ to $3_5$ (Step S36). In this example, since the light beams $3_1$ and $3_5$ are included, the second focus bias adjustment process is terminated without changing $V_f$ from $V_f+W_1$.

The signal plane 1 is therefore positioned at the middle of the remotest $P_3$ and the nearest $P_1$ ($P_5$) along the optical direction of the objective lens 8, among the in-focus points $P_1$ to $P_5$ of the five read light beams $3_1$ to $3_5$, so that $P_2$ and $P_4$ are very near to the signal plane 1. Since the in-focus points $P_1$ to $P_5$ are originally disposed regularly on generally on an arc line and the position distribution of the in-focus points $P_1$ to $P_5$ along the optical axis direction of the objective lens is limited in a narrow area, $P_1$, $P_3$, and $P_5$ are also very near to the signal plane 1 as shown in FIG. 7(2). Thereafter, the objective lens 8 moves to follow a surface vibration of CD-ROM 1, under the control of the focus servo system, any of the in-focus points $P_1$ to $P_5$ of the light beams $3_1$ to $3_5$ does not move greatly spaced from the signal plane 1, and all the light beam $3_1$ to $3_5$ systems can reliably read the record data from CD-ROM 1.

(3-2) Data Read Operation

After the second focus bias adjustment process is completed, in accordance with the A-time data representative of the latest A-time data $AT_3$ input from the first signal processing circuit $26_3$ and the read start point A-time designated by the host computer, the track jump direction and number are determined so that the light beam $3_1$ at the innermost circumference among the h=5 read light beams is focussed in the track-on state on the track (x−1) one track inner than the track x containing the read start point of the A-time.

If the optical pickup 2 is at a position II shown in FIG. 8 after the second focus bias adjustment process is completed, the optical pickup 2 is jumped from the position II by four tracks in the forward direction so we that the light beams $3_1$ to $3_5$ are focussed in the track-on state on the tracks (x−1) to (x+3) (refer to III in FIG. 8). Then, reading the record data on the tracks (x−1) to (x+3) at the same time starts, by using five systems including the photodetector $PD_1$ to first signal processing circuit $26_1$, photodetector $PD_2$ to first signal processing circuit $26_2$, photodetector $PD_3$ to first signal processing circuit $26_3$, photodetector $PD_4$ to first signal processing circuit $264_2$, and photodetector $PD_5$ to first signal processing circuit $26_5$. When all the frame sync detection signals $FS_1$ to $FS_5$ of H level are input from the first signal processing circuits $26_1$ to $26_5$, the general read/write command is supplied to the P/S converter 30.

Upon reception of the general read/write command, the P/S converter 30 writes the data $DATA_1$ to $DATA_5$, output from the first signal processing circuits $26_1$, to $26_5$, into the memories $32_1$ to $32_5$. After-CD-ROM 1 rotates by generally one rotation (in actual, slightly longer than one rotation) and it is confirmed that there is no omission of record data read with the light beam $3_1$ to $3_5$ systems (refer to IV in FIG. 8), record data write into the memories $32_1$ to $32_5$ is intercepted, and the record data is serially read from the memories $32_1$ to $32_5$ in the A-time order by preventing the record data from being duplicated or omitted, to supply the read record data to the second signal processing circuit 40 and supply a track jump command to the system controller 50. The system controller 50 received the track jump command controls the servo circuit 23 to thereby jump the optical pickup 2 by the track jump number J=3 in the forward direction so that the light beams $3_1$ to $3_5$ are focussed in the track-on state on the tracks (x+3) to (x+7) (refer to V in FIG. 8).

When all the frame sync detection signals $FS_1$ to $FS_5$ of H level are output from the first signal processing circuits $26_1$ to $26_5$, a track jump completion notice is supplied to the P/S converter 30. The P/S converter 30 received the track jump completion notice writes the data $DATA_1$ to $DATA_5$ output from the first signal processing circuits $26_1$ to $26_5$, again into the memories $32_1$ to $32_5$. After CD-ROM 1 rotates by generally one rotation (in actual, slightly longer than one rotation) and it is confirmed that there is no omission of record data read with the light beam $3_1$ to $3_5$ systems. (refer to VI in FIG. 8), record data write into the memories $32_1$ to $32_5$ is intercepted, and the record data is serially read from the memories $32_1$ to $32_5$ in the A-time order, starting from the data corresponding to the A-time next to the A-time corresponding to the data lastly output to the second signal processing circuit 40 at the preceding read cycle, by preventing the record data from being duplicated or omitted, to supply the read record data to the second signal processing circuit 40 and supply a track jump command to the system controller 50.

The system controller 50 received the track jump command controls the servo circuit 23 to thereby jump the optical pickup 2 by the track jump number J=3 in the forward direction so that the light beams $3_1$ to $3_5$ are focussed in the track-on state on the tracks (x+7) to (x+11) (refer to VII in FIG. 8).

The second signal processing circuit 40 receives the data serially output from the P/S converter 30, descrambles the data in the unit of one block, and thereafter demodulates Lch and Rch data in conformity with the CD-DA specification through error detection/correction based on CIRC codes (error detection/correction with P parities; deinterleaveing, error detection/correction with Q parities). The second signal processing circuit 40 then demodulates the CD-ROM data from the Lch and Rch data by performing sync detection, descrambling, header detection, and error detection/correction with EDC and ECC codes in accordance with the CD-ROM specification, and thereafter outputs the CD-ROM data to an external host computer.

(4) First Specific Read/write Operation (Read Unable by the Light Beam System $3_5$, Refer to FIGS. 9 and 10)

(4-1) Second Focus Bias Adjustment Process

If the judgement of a presence/absence of a record data unreadable system shows that there is one record data unreadable system of the light beam $3_5$ at the outermost circumference, the system controller 50 allocates M light beams $3_1$ to $3_4$ as the read systems of h light beams. M is the maximum number of adjacent light beam systems usable, which is "4" or a combination of light beams $3_1$ to $3_4$ and M≧3. The continuous read rotation number I is set as I=1, and the read track jump number J is set as J=(M−2)=2 (Step S34). The second focus bias adjustment shown in FIG. 5 is executed to check whether the light beam $3_1$ or $3_5$ is included in the h=4 read light beams $3_1$ to $3_4$ (Step S36). In this example, since the light beam $3_1$ is included, the second focus bias adjustment process is terminated without changing $V_f$ from $V_f+W_1$.

The signal plane 1 is therefore positioned at the middle of the remotest $P_3$ and the nearest $P_1$ along the optical direction of the objective lens 8, among the in-focus points $P_1$ to $P_4$ of the four read light beams $3_1$ to $3_4$, so that $P_2$ and $P_4$ are very near to the signal plane 1. $P_1$, and $P_3$ are also very near to the signal plane 1 as shown in FIG. 7(2). Thereafter, the objective lens 8 moves to follow a surface vibration of CD-ROM 1, under the control of the focus servo system, any of the in-focus points $P_1$ to $P_4$ of the light beams $3_1$ to $3_4$ does not move greatly spaced from the signal plane 1, and all the light beam $3_1$ to $3_4$ systems can reliably read the record data from CD-ROM 1.

(4-2) Data Read Operation

After the second focus bias adjustment process is completed, in accordance with the A-time data representative of the latest A-time data $AT_3$ input from the first signal processing circuit $26_3$ and the read start point A-time designated by the host computer, the track jump direction and number are determined so that the light beam $3_1$ at the innermost circumference among the h=4 read light beams is focussed in the track-on state on the track (x−1) one track inner than the track x containing the read start point of the A-time (Step S35).

If the optical pickup 2 is at a position II shown in FIG. 9 after the second focus bias adjustment process is completed, the optical pickup 2 is jumped from the position II by four tracks in the forward direction so that the light beams $3_1$ to $3_4$ are focussed in the track-on state on the tracks (x−1) to (x+2). Then, reading the record data on the tracks (x−1) to (x+2) at the same time starts, by using four systems including the photodetector $PD_1$ to first signal processing circuit $26_1$, photodetector $PD_2$ to first signal processing circuit $26_2$, photodetector $PD_3$ to first signal processing circuit $26_3$, and photodetector $PD_4$ to first signal processing circuit $26_4$. When all the frame sync detection signals $FS_1$ to $FS_4$ of H level are input from the first signal processing circuits $26_1$ to $26_4$, the specific read/write command including the read system information "1, 2, 3, 4" is supplied to the P/S converter 30.

Upon reception of the specific read/write command via the read controller 34, only the write controllers $31_1$ to $31_4$ indicated by the read system information "1, 2, 3, 4" write one block after another the data $DATA_1$ to $DATA_4$ output from the first signal processing circuits $26_1$ to $26_4$, into the first areas of the memories $32_1$ to $32_4$, and writes the A-time data $AT_1$ to $AT_4$ corresponding to the data $DATA_1$ to $DATA_4$ and the pairs of start addresses $A_{1s}$ to $A_{4s}$ and end addresses $A_{1e}$ to $A_{4e}$ in the memories $32_1$ to $32_4$, into the first areas of the memories $33_1$ to $33_4$. In the example shown in FIG. 9, in the first areas of the memories $33_1$ to $33_4$, the A-time data is written from the frames of 23:40:60, 23:41:00, 23:41:15, and 23:41:30 (refer to FIG. 10).

The read controller 34 received the specific read/write command checks whether there is no omission of record data read with each read system, by referring to the first areas of the memories $33_1$ to $33_4$ indicated by the read system information "1, 2, 3, 4" and used at the present read cycle to confirm that the A-time one frame before the start A-time data in the first area of the memory $33_4$ is contained in the first area of the memory $33_3$, that the A-time one frame before the start A-time data in the first area of the memory $33_3$ is contained in the first area of the memory $33_2$, and that the A-time one frame before the start A-time data in the first area of the memory $33_2$ is contained in the first area of the memory $33_1$.

After the read operation by the optical pickup 2 is performed approximately I=one rotation (in actual, slightly more than one rotation) and the optical pickup 2 reaches a position IV shown in FIG. 9, the contents of the first areas of the memories $33_1$ to $33_4$ become as shown in FIG. 10 and there is no omission of record data read with the read systems. Therefore, the read controller 34 supplies the intercept command to the write controllers $31_1$ to $31_4$ to intercept the write operation, and supplies the track jump command to the system controller 50. With reference to the A-time data and the start and end addresses stored in the first areas among the memories $33_1$ to $33_4$ where data were written at the present read cycle, the read controller 34 controls to read record data in the order of A-time starting from the oldest A-time, relative to the data stored in the first areas among the memories $32_1$ to $32_4$ where data $DATA_1$ to $DATA_4$ were written at the present read cycle, and outputs the read data to the second signal processing circuit 40. In this example, the data from the frame 23:40:60 to the frame 23:41:44 is output.

The write controllers $31_1$ to $31_4$ received the intercept command intercepts the read operation of the memories $32_1$ to $32_4$ and $33_1$ to $33_4$. The system controller 50 received the track jump command supplies the servo circuit 23 with the track jump command indicating a track jump by J=2 tracks in the forward direction to thereby jump the optical pickup 2 from the position IV to a position V shown in FIG. 9. After the light beams $3_1$ to $3_4$ are focussed in the track-on state on the tracks (x+2) to (x+5), reading, record data resumes. When all the frame sync detection signals $FS_1$ to $FS_4$ of H level are output from the first signal processing circuits $26_1$ to $26_4$, the track jump completion notice is read and supplied to the controller 34.

The controller 34 received the track jump completion notice supplies the resume command to the write controllers $31_1$ to $31_4$, and the write controllers $31_1$ to $31_4$ received the resume command write the data $DATA_1$ to $DATA_4$ output from the first signal processing circuits $26_1$ to $26_4$ after the track jump, this time into the second areas of the memories $32_1$ to $32_4$, and writes the A-time data $AT_1$ to $AT_4$ corresponding to the data $DATA_1$ to $DATA_4$ and the pairs of start addresses $a_{1s}$ to $a_{4s}$ and end addresses $a_{1e}$ to $a_{4e}$ in the memories $32_1$ to $32_4$, into the second areas of the memories $33_1$ to $33_4$. In the example shown in FIG. 9, in the second areas of the memories $33_1$ to $33_4$, the A-time data is written from the frames of 23:41:331 23:41:48, 23:41:63, and 23:42:03 (refer to FIG. 10).

After the read controller 34 supplies the resume command, the read controller 34 checks whether there is no omission of record data read with each read system, by referring to the second areas of the memories $33_1$ to $33_4$ used at the present read cycle to confirm that the A-time one frame before the start A-time data in the second area of the memory $33_4$ is contained in the second area of the memory $33_3$, that the A-time one frame before the start A-time data in the second area of the memory $33_3$ is contained in the second area of the memory $33_2$, and that the A-time one frame before the start A-time data in the second area of the memory $33_2$ is contained in the second area of the memory $33_1$. After the read operation by the optical pickup 2 is performed approximately I=one rotation (in actual, slightly more than one rotation) and the optical pickup 2 reaches a position VI shown in FIG. 9, the contents of the second areas of the memories $33_1$ to $33_4$ become as shown in FIG. 9 and there is no omission of record data read with the read systems "1, 2, 3, 4". Therefore, the read controller 34 supplies the intercept command to the write controllers $31_1$ to $31_4$ to intercept the write operation, and supplies the track jump command to the system controller 50. With reference to the A-time data and the start and end addresses stored in the second areas among the memories $33_1$ to $33_4$ where data were written at the present read cycle, the read controller 34 controls to read record data in the order of A-time starting from the A-time next to the one block data lastly output to the second signal processing circuit 40 at the preceding read cycle, relative to the data stored in the second areas among the memories $32_1$ to $32_4$ where data $DATA_1$ to $DATA_4$ were written at the present read cycle, and outputs the read data to the second signal processing circuit 40. In this example, the data from the frame 23:41:45 to the frame 23:42:17 is output.

The write controllers $31_1$ to $31_4$ received the intercept command intercepts the read operation. The system controller 50 received the track jump command controls to jump the optical pickup 2 from the position VI to a position VII shown in FIG. 9. After the light beams $3_1$ to $3_4$ are focussed in the track-on state on the tracks (x+5) to (x+8), reading record data resumes. When all the frame sync detection signals $FS_1$ to $FS_4$ of H level are output from the first signal processing circuits $26_1$ to $26_4$, the track jump completion notice is read and supplied to the controller 34. Thereafter, similar operations are repeated to read at high speed desired record data from CD-ROM 1 by using the four beams $3_1$ to $3_4$ and by preventing the record data from being duplicated and omitted.

Figure 11:
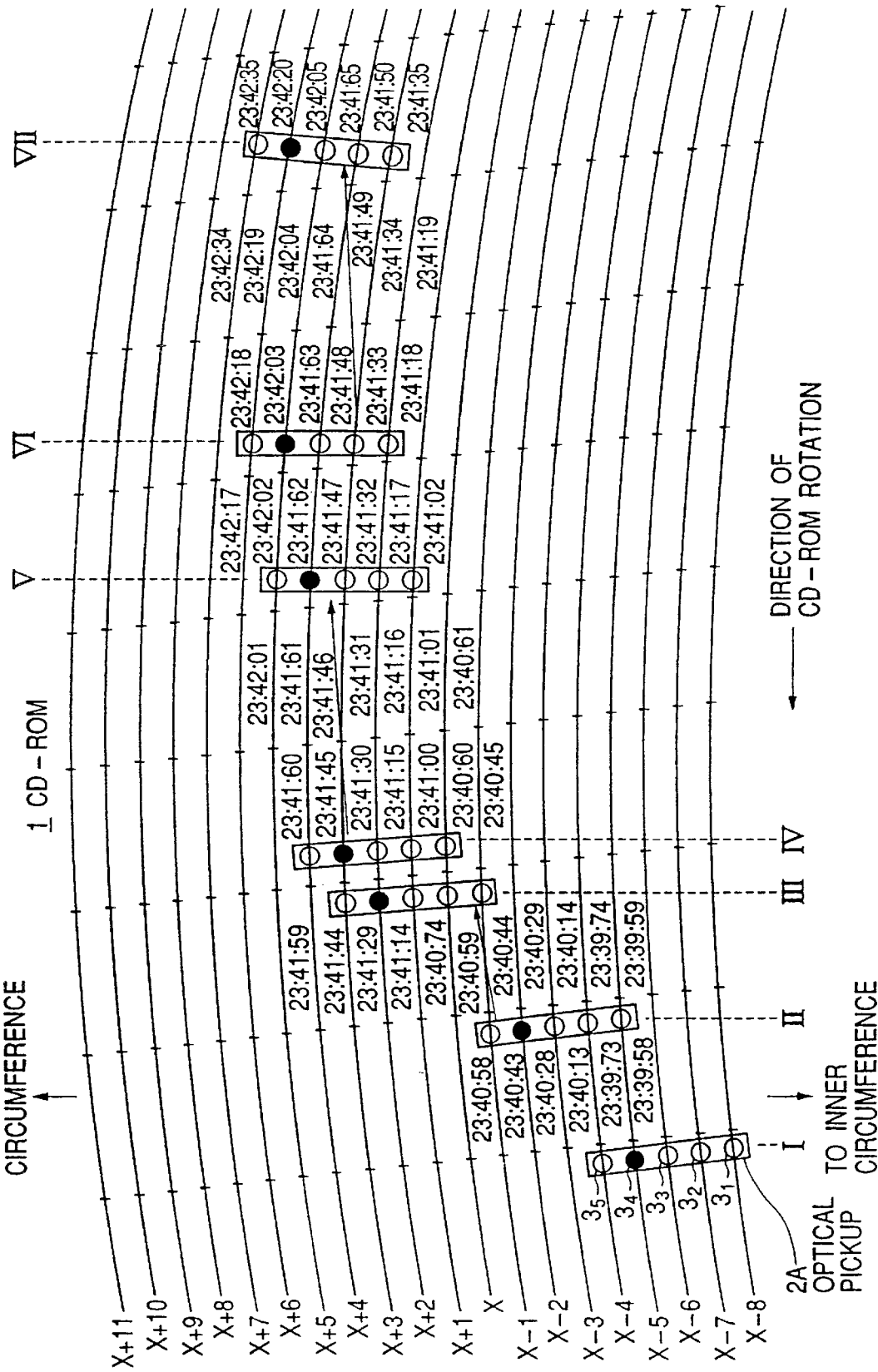
FIG. 11 is a diagram illustrating an example of a data read operation of the multibeam type CD-ROM read apparatus shown in FIG. 1.
Figure 12:
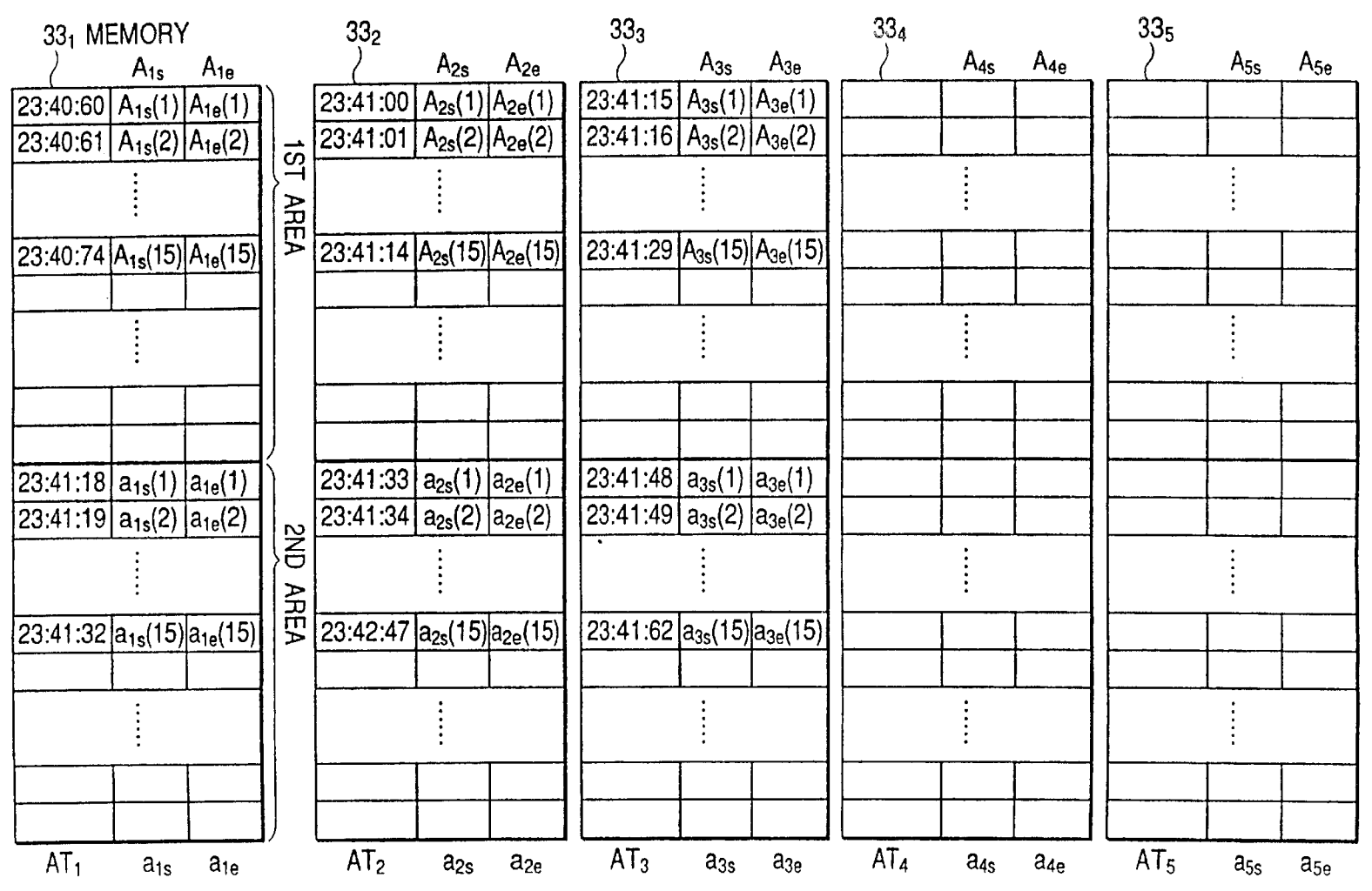

(5) Second Specific Read/write Operation (Read Unable by the Light Beam System $3_4$, refer FIGS. 11 and 12)

(5-1) Second Focus Bias Adjustment

If the judgement of a presence/absence of a record data unreadable system shows that there is one record data unreadable system of the light beam $3_4$, the system controller 50 allocates M=3 light beams $3_1$ to $3_3$ as the read systems of h light beams, where M is the maximum number of adjacent light beam systems usable, which is "3" or a combination of light beams $3_1$ to $3_3$ and M≧3. The continuous read rotation number I is set as I=1, and the read track jump number J is set to J=(M−2)=1 (Step S35). The second focus bias adjustment shown in FIG. 5 is executed to check whether the light beam $3_1$ or $3_5$ is included in the h=3 read light beams $3_1$ to $3_3$ (Step S36). In this example, since the light beam $3_1$ is included, the second focus bias adjustment process is terminated without changing $V_f$ from $V_f+W_1$.

The signal plane 1 is therefore positioned at the middle of the remotest $P_3$ and the nearest $P_1$ along the optical direction of the objective lens 8, among the in-focus points $P_1$ to $P_3$ of the three read light beams $3_1$ to $33_1$, SO that $P_2$ is very near to the signal plane 1. $P_1$ and $P_3$ are also very near to the signal plane 1 as shown in FIG. 7(2). Thereafter, the objective lens 8 moves to follow a surface vibration of CD-ROM 1, under the control of the focus servo system, any of the in-focus points $P_1$ to $P_3$ of the light beams $3_1$ to $3_3$ does not move greatly spaced from the signal plane 1, and all the light beam $3_1$ to $3_3$ systems can reliably read the record data from CD-ROM 1.

(5-2) Data Read Operation

After the second focus bias adjustment process is completed, in accordance with the A-time data representative of the latest A-time data $AT_3$ input from the first signal processing circuit $26_3$ and the read start point A-time designated by the host computer, the track jump direction and number are determined so that the light beam $3_1$ at the innermost circumference among the h=3 read light beams is focussed in the track-on state on the track (x−1) one track inner than the track x containing the read start point of the A-time (Step S35).

If the optical pickup 2 is at a position II shown in FIG. 11 after the second focus bias adjustment process is completed, the optical pickup 2 is jumped from the position II by four tracks in the forward direction so that the light beams $3_1$ to $3_3$ are focussed in the track-on state on the tracks (x−1) to (x+1) (refer to III in FIG. 11). Then, reading the record data on the tracks (x−1) to (x+1) at the same time starts, by using three systems including the photodetectors $PD_1$ to first signal processing circuit $26_2$, photodetector $PD_2$ to first signal processing circuit $26_2$, and photodetector $PD_3$ to first signal processing circuit $26_3$. When all the frame sync detection signals $FS_1$ to $FS_3$ of H level are input from the first signal processing circuits $26_1$ to $26_3$, the specific read/write command including the read system information "1, 2, 3" is supplied to the P/S converter 30.

Upon reception of the specific read/write command via the read controller 34, only the write controllers $31_1$ to $31_3$ indicated by the read system information "1, 2, 3" write one block after another the data $DATA_1$ to $DATA_3$ output from the first signal processing circuits $26_1$ to $26_3$, into the first areas of the memories $32_1$ to $32_4$, and writes the A-time data $AT_1$ to $AT_3$ corresponding to the data $DATA_1$ to $DATA_3$ and the pairs of start addresses $A_{1s}$ to $A_{3s}$ and end addresses $A_{1e}$ to $A_{3e}$ in the memories $32_1$ to $32_3$, into the first areas of the memories $33_1$ to $33_3$. In the example shown in FIG. 11, in the first areas of the memories $33_1$ to $33_4$, the A-time data is written from the frames of 23:40:60, 23:41:00, and 23:41:15 (refer to FIG. 12).

The read controller 34 received the specific read/write command checks whether there is no omission of record data read with each read system, by referring to the first areas of the memories $33_1$ to $33_3$ indicated by the read system information "1, 2, 3" and used at the present read cycle to confirm that the A-time one frame before the start A-time data in the first area of the memory $33_3$ is contained in the first area of the memory $33_2$, and that the A-time one frame before the start A-time data in the first area of the memory $33_2$ is contained in the first area of the memory $33_1$.

After the read operation by the optical pickup 2 is performed approximately I=one rotation (in actual, slightly more than one rotation) and the optical pickup 2 reaches a position IV shown in FIG. 11, the contents of the first areas of the memories $33_1$ to $33_4$ become as shown in FIG. 12 and there is no omission of record data read with the read systems. Therefore, the read controller 34 supplies the intercept command to the write controllers $31_1$ to $31_3$ to intercept the write operation, and supplies the track jump command to the system controller 50. With reference to the A-time data and the start and end addresses stored in the first areas among the memories $33_1$ to $33_4$ where data were written at the present read cycle, the read controller 34 controls to read record data in the order of A-time starting from the oldest A-time, relative to the data stored in the first areas among the memories $32_1$ to $32_3$ where data $DATA_1$ to $DATA_3$ were written at the present read cycle, and outputs the read data to the second signal processing circuit 40. In this example, the data from the frame 23:40:60 to the frame 23:41:29 is output.

The write controllers $31_1$ to $31_3$ received the intercept command intercepts the read operation. The system controller 50 received the track jump command supplies the servo circuit 23 with the track jump command indicating a track jump by J=1 track in the forward direction to thereby jump the optical pickup 2 from the position IV to a position V shown in FIG. 11. After the light beams $3_1$ to $3_3$ are focussed in the track-on state on the tracks (x+1) to (x+3), reading record data resumes. When all the frame sync detection signals $FS_1$ to $FS_3$ of H level are output from the first signal processing circuits $26_1$ to $26_3$, the track jump completion notice is read and supplied to the controller 34. The controller 34 received the track jump completion notice supplies the resume command to the write controllers $31_1$ to $31_3$, and the write controllers $31_1$ to $31_3$ received the resume command write the data $DATA_1$ to $DATA_3$ output from the first signal processing circuits $26_1$ to $26_3$ after the track jump, this time into the second areas of the memories $32_1$ to $32_3$, and writes the A-time data $AT_1$ to $AT_3$ corresponding to the data $DATA_1$ to $DATA_3$ and the pairs of start addresses $a_{1s}$ and $a_{3s}$ end addresses $a_{1e}$ to $a_3$ in the memories $32_1$ to $32_3$, into the second areas of the memories $33_1$ to $33_3$. In the example shown in FIG. 11, in the second areas of the memories $33_1$ to $33_4$, the A-time data is written from the frames of 23:41:18, 23:41:$33_1$ and 23:41:48 (refer to FIG. 12).

After the read controller 34 supplies the resume command, the read controller 34 checks whether there is no omission of record data read with each read system, by referring to the second areas of the memories $33_1$ to $33_3$ used at the present read cycle to confirm that the A-time one frame before the start A-time data in the second area of the memory $33_3$ is contained in the second area of the memory $33_2$, and that the A-time one frame before the start A-time data in the second area of the memory $33_2$ is contained in the second area of the memory $33_1$.

After the read operation by the optical pickup 2 is performed approximately I=one rotation (in actual, slightly more than one rotation) and the optical pickup 2 reaches a position VI shown in FIG. 11, the contents of the second areas of the memories $33_1$ to $33_3$ become as shown in FIG. 12 and there is no omission of record data read with the read systems "1, 2, 3". Therefore, the read controller 34 supplies the intercept command to the write controllers $31_1$ to $31_3$ to intercept the write operation, and supplies the track jump command to the system controller 50. With reference to the A-time data and the start and end addresses stored in the second areas among the memories $33_1$ to $33_3$ where data were written at the present read cycle, the read controller 34 controls to read record data in the order of A-time starting from the A-time next to the one block data lastly output to the second signal processing circuit 40 at the preceding read cycle, relative to the data stored in the second areas among the memories $32_1$ to $32_3$ where data $DATA_1$ to $DATA_3$ were written at the present read cycle, and outputs the read data to the second signal processing circuit 40. In this example, the data from the frame 23:41:30 to the frame 23:41:62 is output.

The write controllers $31_1$ to $31_3$ received the intercept command intercepts the read operation. The system controller 50 received the track jump command controls to jump the optical pickup 2 by the jump track number J=1 from the position VI to a position VII shown in FIG. 11 After the light beams $3_1$ to $3_3$ are focussed in the track-on state on the tracks (x+3) to (x+5), reading record data resumes. When all the frame sync detection signals $FS_1$ to $FS_3$ of H level are output from the first signal processing circuits $26_1$ to $26_3$, the track jump completion notice is read and supplied to the controller 34 Thereafter, similar operations are repeated to read at high speed desired record data from CD-ROM 1 by using the three beams $3_1$ to $3_3$ and by preventing the record data from being duplicated and omitted.

Figure 13:
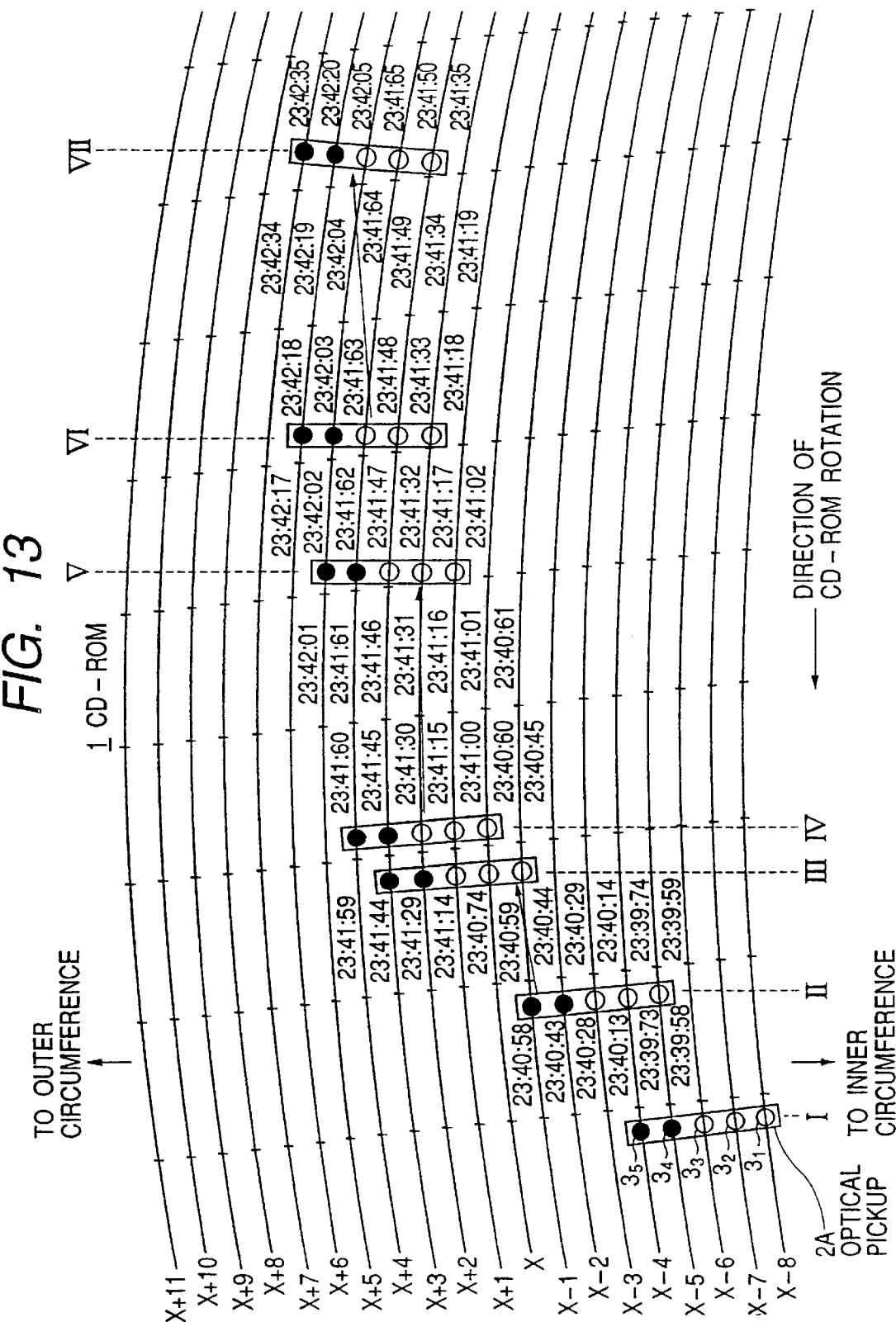
FIG. 13 is a diagram illustrating an example of a data read operation of the multibeam type CD-ROM read apparatus shown in FIG. 1.

(6) Third Specific Read/write Operation (Read Unable by the Light Beam Systems $3_4$ and $3_5$, Refer to FIGS. 13 and 12)

(6-1) Second Focus Bias Adjustment

If the judgement of a presence/absence of a record data unreadable system shows that there are two record data unreadable systems of the light beams $3_4$ and $3_5$, the system controller 50 allocates M=3 light beams $3_1$ to $3_3$ as the read systems of h light beams, where M is the maximum number of adjacent light beam systems usable, which is "3" or a combination of light beams $3_1$ to $3_3$ and M>3. The continuous read rotation number I is set as I=1, and the read track jump number J is set to J=(M−2) (Step S35). The second focus bias adjustment shown in FIG. 5 is executed to check whether the light beam $3_1$ or $3_5$ is included in the h=3 read light beams $3_1$ to $3_3$ (Step S36). In this example, since the light beam $3_1$ is included, the second focus bias adjustment process is terminated without changing $V_f$ from $V_f+W_1$.

The signal plane 1 is therefore positioned at the middle of the remotest $P_3$ and the nearest $P_1$ along the optical direction of the objective lens 8, among the in-focus points $P_1$ to $P_3$ of the three read light beams $3_1$ to $3_3$ so that $P_2$ is very near to the signal plane 1. $P_1$ and $P_3$ are also very near to the signal plane 1 as shown in FIG. 7(2). Thereafter, the objective lens 8 moves to follow a surface vibration of CD-ROM 1, under the control of the focus servo system, any of the in-focus points $P_1$ to $P_3$ of the light beams $3_1$ to $3_3$ does not move greatly spaced from the signal plane 1, and all the light beam $3_1$ to $3_3$ systems can reliably read the record-data from CD-ROM 1.

(6-2) Data Read Operation

After the second focus bias adjustment process is completed, in accordance with the A-time data representative of the latest A-time data $AT_3$ input from the first signal processing circuit $26_3$ and the read start point A-time designated by the host computer, the track jump direction and number are determined so that the light beam $3_1$ at the innermost circumference among the h=3 read light beams is focussed in the track-on state on the track (x−1) one track inner than the track x containing the, read start point of the A-time (Step S35).

If the optical pickup 2 is at a position II shown in FIG. 13 after the second focus bias adjustment process is completed, the optical pickup 2 is jumped from the ,position II by four tracks in the forward direction so that the light beams $3_1$ to $3_3$ are focussed in the track-on state on the tracks (x−1) to (x+1) (refer to III in FIG. 13). Then, reading the record data on the tracks (x−1) to (x+1) at the same time starts, by using three systems including the photodetector $PD_1$ to first signal processing circuit $26_1$, photodetector $PD_2$ to first signal processing circuit $26_2$, and photodetector $PD_3$ to first signal processing circuit $26_3$. When all the frame sync detection signals $FS_1$ to $FS_3$ of H level are input from the first signal processing circuits $26_1$ to $26_3$, the specific read/write command including the read system information "1, 2, 3" is supplied to the P/S converter 30.

Thereafter, quite similar to the case shown in FIG. 11, an operation of reading record data from CD-ROM 1 by approximately one rotation, jumping the optical pickup by the track jump number J=1, again reading record data from CD-ROM 1 by approximately one rotation, and jumping the optical pickup by the track jump number J=1 is repeated (refer to III to VII in FIG. 13) to read record data at high speed in the record order by preventing the record data from being duplicated and omitted.

Figure 14:
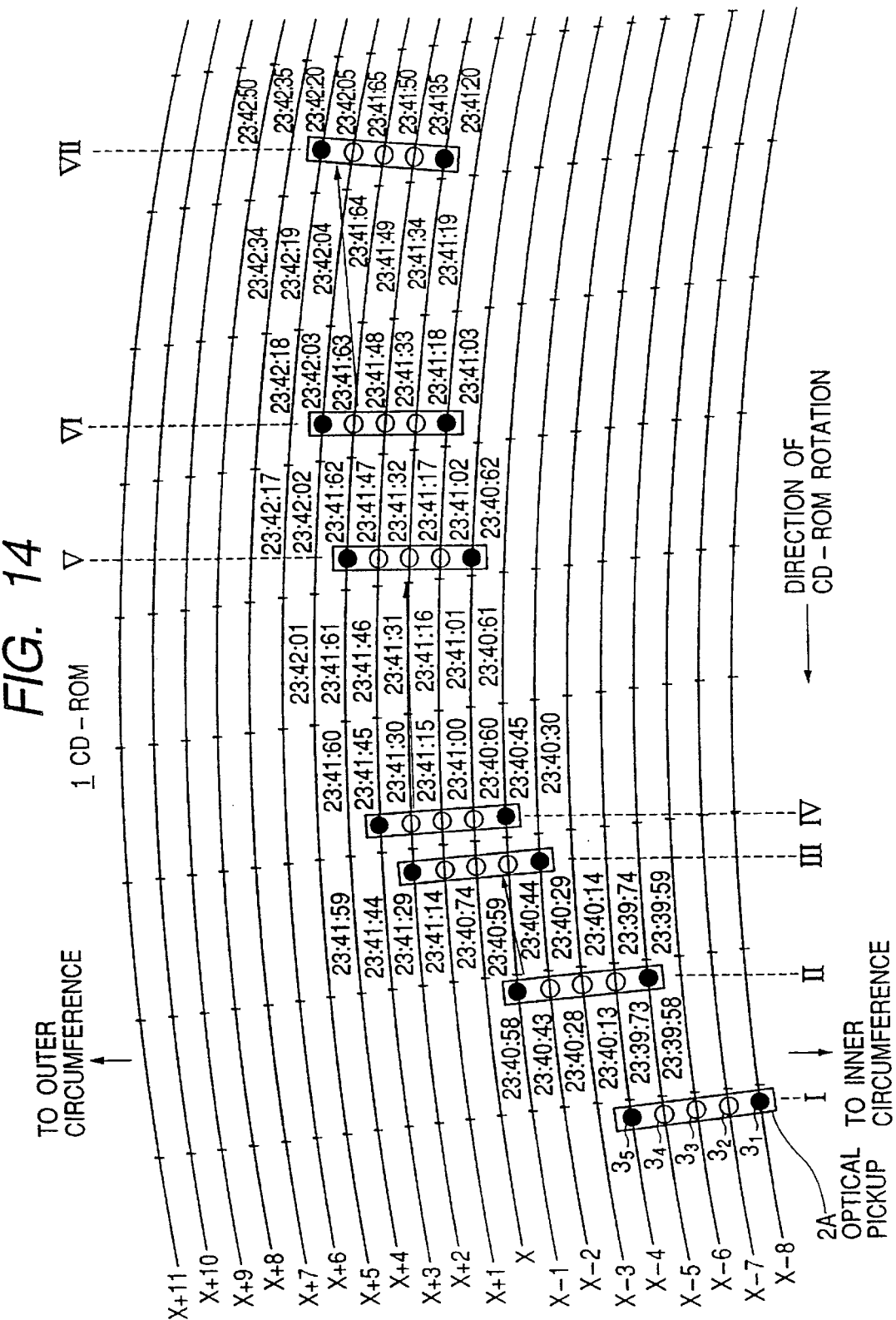
FIG. 14 is a diagram illustrating an example of a data read operation of the multibeam type CD-ROM read apparatus shown in FIG. 1.

(7) Fourth Specific Read/write Operation (Read Unable by the Light Beam Systems $3_1$ and $3_5$, Refer to FIG. 14)

(7-1) Second Focus Bias Adjustment Process

If the judgement of a presence/absence of a record data unreadable system shows that there are two record data unreadable systems of the light beams $3_1$ and $3_5$, the system controller 50 allocates M=3 light beams $3_2$ to $3_4$ as the read systems of h light beams, where M is the maximum number of adjacent light beam systems usable, which is "3" or a combination of light beams $3_2$ to $3_4$ and M≧3. The continuous read rotation number I is set as I=1, and the read track jump number J is set to J=(M−2)=1 (Step S35). The second focus bias adjustment shown in FIG. 5 is executed to check whether the light beam $3_1$ or $3_5$ is included in the h=3 read light beams $3_2$ to $3_4$ (Step S36). In this example, since the light beam $3_1$ or $3_5$ is not included, the second focus bias voltage generator circuit $22_4$ is controlled to change $V_f$ from the value of $V_f=V_f+W_1$ to the value of $V_f=V_f+W_2$ ($W_2<W_1$) (Step S39) so that $V_f=(V_f+W_1)-W_1+W_2=V_f-W_1+W_2$.

The signal plane 1 is therefore positioned at the middle of the remotest $P_3$ and the nearest $P_1$ along the optical direction of the objective lens 8, among the in-focus points $P_2$ to $P_4$ of the three read light beams $3_2$ to, $3_4$, so that all the in-focus points $P_2$ to $P_4$ are very near to the signal plane 1 (refer to FIG. 7(3)). Thereafter, the objective lens 8 moves to follow a surface vibration of CD-ROM 1, under the control of the focus servo system, all the in-focus points $P_2$ to $P_4$ are maintained very near to the signal plane 1, and all the light beam $3_2$ to $3_4$ systems can more reliably read the record data from CD-ROM 1 than the case of FIG. 7(2).

(7-2) Data Read Operation

After the second focus bias adjustment process is completed, in accordance with the A-time data representative of the latest A-time data $AT_3$ input from the first signal processing circuit $26_3$ and the read start point A-time designated by the host computer, the track jump direction and number are determined so that the light beam $3_2$ at the innermost circumference among the h=3 read light beams is focussed in the track-on state on the track (x−1) one track inner than the track x containing the read start point of the A-time (Step S35).

If the optical pickup 2 is at a position II shown in FIG. 14 after the second focus bias adjustment process is completed, the optical pickup 2 is jumped from the position II by three tracks in the forward direction so that the light beams $3_2$ to $3_4$ are focussed in the teke-on state on the tracks (x-1) to (x+1). Then, reading the record data on the tracks (x-1) to (x+1) at the same time starts, by using three systems including the photodetector $PD_2$ to first signal processing circuit $26_2$, photodetector $PD_3$ to first signal processing circuit $26_3$ and photodetector $PD_4$ to first signal processing circuit $26_4$. When all the frame sync detection signals $FS_2$ to $FS_4$ of H level are input from the first signal processing circuits $26_2$ to $26_4$, the specific read/write command including the read system information "2, 3, 4" is supplied to the P/S converter 30.

Thereafter, nearly similar to the case shown in FIG. 11 (in the case of FIG. 14, the write controllers $31_2$ and $31_4$ control to write the data $DATA_2$ and $DATA_4$ and A-time data $AT_2$ and $AT_4$ output from the first signal processing circuits $26_2$ to $26_4$, into the memories $32_2$ and $32_4$ and $33_2$ to $33_4$, and with reference to the the A-time data and start and end addresses stored in the memories $33_2$ and $33_4$, the read controller 34 controls to read record data stored in the memories $33_2$ and $33_4$ in the order of At-time by preventing the record data from being duplicated and omitted), an operation of reading record data from CD-ROM 1 by approximately one rotation, jumping the optical pickup by the track jump number J=1, again reading record data from CD-ROM 1 by approximately one rotation, and jumping the optical pickup by the track jump number J=1 is repeated (refer to III to VII in FIG. 14) to sequentially read record data at high speed in the record order by preventing the record data from being duplicated and omitted.

Figure 15:
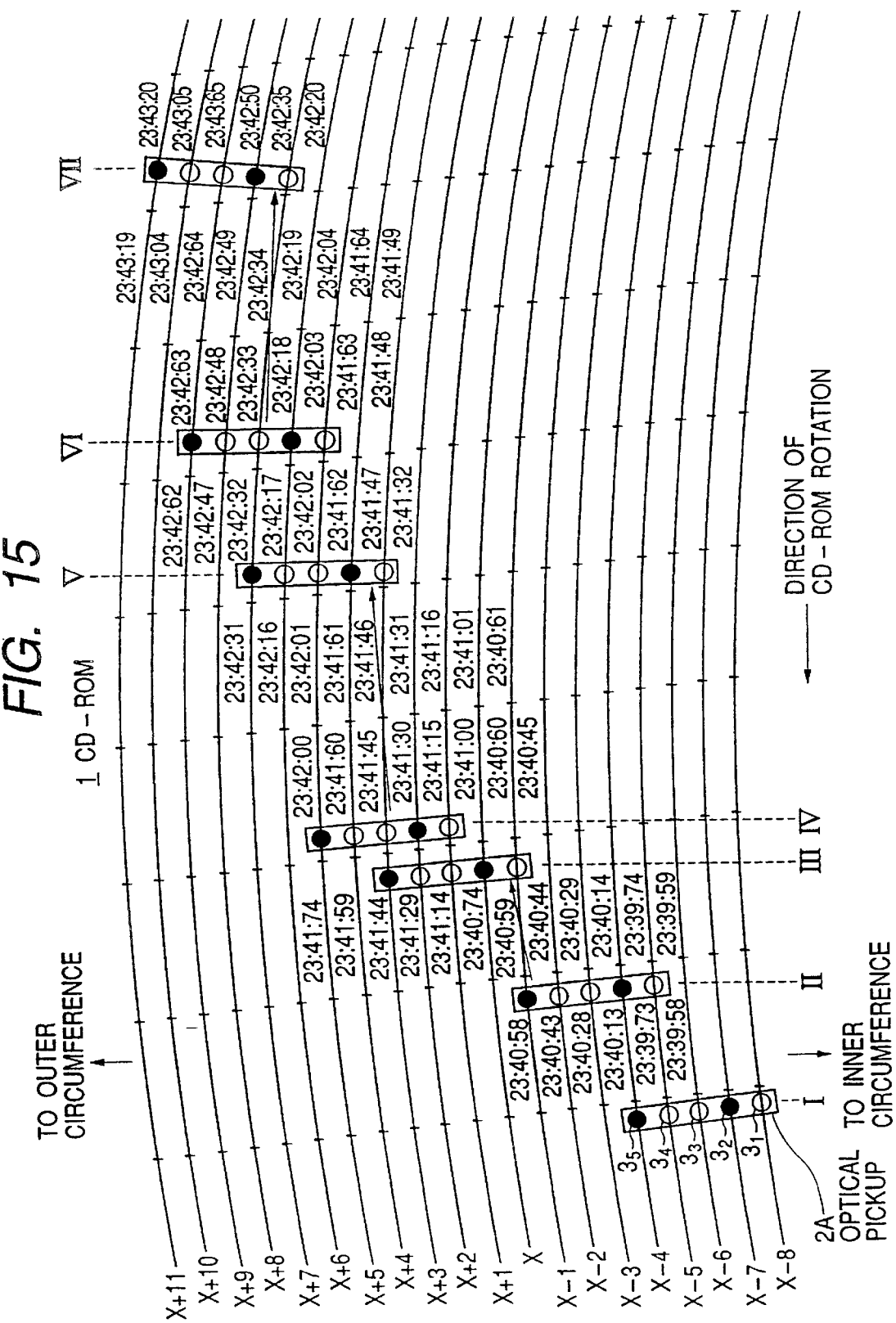
FIG. 15 is a diagram illustrating an example of a data read operation of the multibeam type CD-ROM read apparatus shown in FIG. 1.

(8) Fifth Specific Read/write Operation (Read Unable by the Light Beams $3_2$ and $3_5$, Refer to FIGS. 15 and 16)

(8-1) Second Focus Bias Adjustment

If a judgement of a presence/absence of a record data unreadable system shows that there are two record data unreadable systems of the light beams $3_2$ and $3_5$, then only two light beams $3_3$ and $3_4$ are adjacent each other among the remaining three light beams $3_1$, $3_3$, and $3_4$. In reading at high speed record data of CD-ROM 1 by repetitively performing continuous record data read by approximately two rotations and track jump, it is necessary to read record data only with adjacent light beams. High speed read is possible even for a combination of read light beams not completely adjacent each other, if continuous record data read of CD-ROM 1 during a plurality of rotations and track jump by predetermined tracks are repeated.

Specifically, continuously reading record data with data -readable light beams during approximately (R+1) rotations and track jump by (Q-1) tracks in the forward direction can be repeated if Q is 2 or larger and R is 0 or larger, where Q is the number of tracks representing a distance between the innermost light beam and outermost light beam among the record data readable light beam systems, and R is the maximum number of adjacent record data unreadable light beams between the innermost and outermost record data readable light beams.

In the example shown in FIGS. 15 and 16, of the record data readable light beam systems, the innermost light beam is the light beam $3_1$ and the outermost light beam is the light beam $3_4$ so that Q=3. In the adjacent record data unreadable light beams between the light beams $3_1$ and $3_4$, the maximum number of adjacent record data unreadable light beams is "1" because there is only the light beam $3_2$. As the h read light beam systems, all the three record data readable light beam systems $3_1$, $3_3$, and $3_4$ are allocated. The continuous read rotation number I is set as I=(R+1)=2, and the read track jump number J is set to J=(Q-1)=2 (Step S35). The second focus bias adjustment shown in FIG. 5 is executed to check whether the light beam $3_1$ or $3_5$ is included in the h=3 read light beams $3_1$, $3_3$, and $3_4$ (Step S36). In this example, since the light beam $3_1$ is included, the second focus bias adjustment process is terminated without changing $V_f$ from $V_f + W_1$.

The signal plane 1 is therefore positioned at the middle of the remotest $P_3$ and the nearest $P_1$ along the optical direction of the objective lens 8, among the in-focus points $P_1$, $P_3$, and $P_4$ of the three read light beams $3_1$, $3_3$, and $3_4$, so that the in-focus point $P_4$ is very near to the signal plane and also the in-focus points $P_1$ and $P_3$ are also near the signal plane 1 (refer to FIG. 7(2)). Thereafter, the objective lens 8 moves to follow a surface vibration of CD-ROM 1, under the control of the focus servo system, all the in-focus points $P_1$, $P_3$, and $P_4$ are maintained very near to the signal plane 1, and all the light beam $3_1$, $3_3$, and $3_4$ systems can reliably read the record data from CD-ROM 1.

(8-2) Data Read Operation

After the second focus bias adjustment process is completed, in accordance with the A-time data representative of the latest A-time data $AT_3$ input from the first signal processing circuit $26_3$ and the read start point A-time designated by the host computer, the track jump direction and number are determined so that the light beam $3_1$ at the innermost circumference among the h=3 read light beams is focussed in the track-on state on the track (x-1) one track inner than the track x containing the read -start point-of the A-time (Step S35).

If the optical pickup 2 is at a position II shown in FIG. 15 after the second focus bias adjustment process is completed, the optical pickup 2 is jumped from the position II by four tracks in the forward direction so that the light beams $3_1$, $3_3$ and $3_4$ are focussed in the track-on state on the tracks (x-1), (x+1), and (x+2). Then, reading the record data on the tracks (x-1) to (x+2) at the same time starts, by using three systems including the photodetector $PD_1$ to first signal processing circuit $26_1$, photodetector $PD_3$ to first signal processing circuit $26_3$ and photodetector $PD_4$ to first signal processing circuit $26_4$. When all the frame sync detection signals $FS_1$, $FS_3$, and $FS_4$ of H level are input from the first signal processing circuits $26_1$, $26_3$, and $26_4$, the specific read/write command including the read system information "1, 3, 4" is supplied to the P/S converter 30.

Upon reception of the specific read/write command via the read controller 34, only the write controllers $31_1$, $31_3$, and $31_4$ indicated by the read system information "1, 3, 4" write one block after another the data $DATA_1$, $DATA_3$, and $DATA_4$ output from the first signal processing circuits $26_1$, $26_3$, and $26_4$, into the first areas of the memories $32_1$, $32_3$, and $32_4$, and writes the A-time data $AT_1$, $AT_3$, and $AT_4$ corresponding to the data $DATA_1$, $DATA_3$, and $DATA_4$ and the pairs of start addresses $A_{1s}$, $A_{3s}$ and $A_{3s}$, and end addresses $A_{1e}$, $A_{3e}$, and $A_{4e}$ in the memories $32_1$, $32_3$, and $32_4$, into the first areas of the memories $33_1$, $33_3$, and $33_4$. In the example shown in FIG. 15, in the first areas of the memories $33_1$, $33_3$, and $33_4$, the A-time data is written from the frames of 23:40:60, 23:41:15, and 23:41:30 (refer to FIG. 16).

The read controller 34 received the specific read/write command checks whether there is no omission of record data read with each read system, by referring to the first areas of the memories $33_1$, $33_3$, and $33_4$ indicated by the read system information "1, 3, 4" and used at the present read cycle to confirm that the A-time one frame before the start A-time data in the first area of the memory $33_4$ is contained in the first area of the memory $33_3$, and that the A-time one frame before the start A-time data in the first area of the memory $33_3$ is contained in the first area of the memory $33_1$.

After the read operation by the optical pickup 2 is performed approximately I=two rotations (in actual, slightly more than two rotations) and the optical pickup 2 reaches a position IV shown in FIG. 15, the contents of the first areas of the memories $33_1$, $33_3$, and $33_4$ become as shown in FIG. 16 and there is no omission of record data read with the read systems. Therefore, the read controller 34 supplies the intercept command to the write controllers $31_1$, $31_3$, and to $31_4$ to intercept the write operation, and supplies the track jump command to the system controller 50. With reference to the A-time data and the start and end addresses stored in the first areas among the memories $33_1$, $33_3$, and $33_4$ where data were written at the present read cycle, the read controller 34 controls to read record data in the order of A-time starting from the oldest A-time, relative to the data stored in the first areas among the memories $32_1$, $32_3$, and $32_4$ where data $DATA_1$, $DATA_3$, and $DATA_4$ were written at the present read cycle, and outputs the read data to the second signal processing circuit 40. In this example, the data from the frame 23:40:60 to the frame 23:41:59 is output.

The write controllers $31_1$, $31_3$, and $31_4$ received the intercept command intercepts the read operation. The system controller 50 received the track jump command supplies the servo circuit 23 with the track jump command indicating a track jump by J=2 tracks in the forward direction to thereby jump the optical pickup 2 from the position IV to a position V shown in FIG. 15. After the light beams $3_1$, $33_1$ and 34 are focussed in the track-on state on the tracks (x+3) (x+5) and (x+6), reading record data resumes. When all the frame sync detection signals $FS_1$, $FS_3$, and $FS_4$ of H level are output from the first signal processing circuits $26_1$, $26_3$, and $26_4$, the track jump completion notice is read and supplied to the controller 34.

The controller 34 received the track jump completion notice supplies the resume command to the write controllers $31_1$, $31_3$, and $31_4$, and the write controllers $31_1$, $31_3$, and $31_4$ received the resume command write the data $DATA_1$, $DATA_3$, and $DATA_4$ output from the first signal processing circuits $26_1$, $26_3$, and $26_4$ after the track jump, this time into the second areas of the memories $32_1$, $32_3$, and $32_3$, and writes the A-time data $AT_1$, $AT_3$, and $AT_4$ corresponding to the data $DATA_1$, $DATA_3$, and $DATA_3$ and the pairs of start addresses $a_{1s}$, $a_{3s}$, and $a_{4s}$ and end addresses $a_{1e}$, $a_{3e}$, and $a_{4e}$, in the memories $32_1$ to $32_3$, into the second areas of the memories $33_1$, $33_3$, and $33_4$. In the example shown in FIG. 15, in the second areas of the memories $33_1$, $33_3$, and $33_4$, the A-time data is written from the frames of 23:41:48, 23:42:03, and 23:42:18 (refer to FIG. 16).

After the read controller 34 supplies the resume command, the read controller 34 checks whether there is no omission of record data read with each read system, by referring to the second areas of the memories $33_1$, $33_3$, and $33_4$ used at the present read cycle to confirm that the A-time one frame before the start A-time data in the second area of the memory $33_4$ is contained in the second area of the memory $33_3$, and that the A-time one frame before the start A-time data in the second area of the memory $33_3$ is contained in the second area of the memory $33_1$ After the read operation by the optical pickup 2 is performed approximately I=two rotations (in actual, slightly more than two rotations) and the optical pickup 2 reaches a position VI shown in FIG. 15, the contents of the second areas of the memories $33_1$, $33_3$, and $33_4$ become as shown in FIG. 16 and there is no omission of record data read with the read systems "1, 3, 4". Therefore, the read controller 34 supplies the intercept command to the write controllers $3_1$, $31_3$, and $31_4$ to intercept the write operation, and supplies the track jump command to the system controller 50. With reference to the A-time data and the start and end addresses stored in the second areas among the memories $33_1$, $33_3$, and $33_4$ where data were written at the present read cycle, the read controller 34 controls to read record data in the order of A-time starting from the A-time next to the one block data lastly output to the second signal processing circuit 40 at the preceding read cycle, relative to the data stored in the second areas among the memories $32_1$, $32_3$, and $32_4$ where data $DATA_1$, $DATA_3$, and $DATA_4$ were written at the present read cycle, and outputs the read data to the second signal processing circuit 40. In this example, the data from the frame 23:41:60 to the frame 23:42:47 is output.

The write controllers $31_1$, $31_3$, and, $31_4$ received the intercept command intercepts the read operation. The system controller 50 received the track jump command controls to jump the optical pickup 2 by the jump track number J=2 from the position VI to a position VII shown in FIG. 15. After the light beams $3_1$, $3_3$, and $3_4$ are focussed in the track-on state on the tracks (x+7), (x+9), and (x+10), reading record data resumes. Thereafter, similar operations are repeated to read at high speed desired record data from CD-ROM 1 by using the three beams $3_1$, $3_3$, and $3_3$ and by preventing the record data from being duplicated and omitted.

For example, in order to read the record data from the 9 tracks from the track (x−1) to the track (x+7) shown in FIG. 15, only reading the record data of CD-ROM 1 during four rotations and one track jump are required. Therefore, the record data can be read more rapidly than data is read with one light beam from CD-ROM 1 during 9 rotations.

Figure 17:
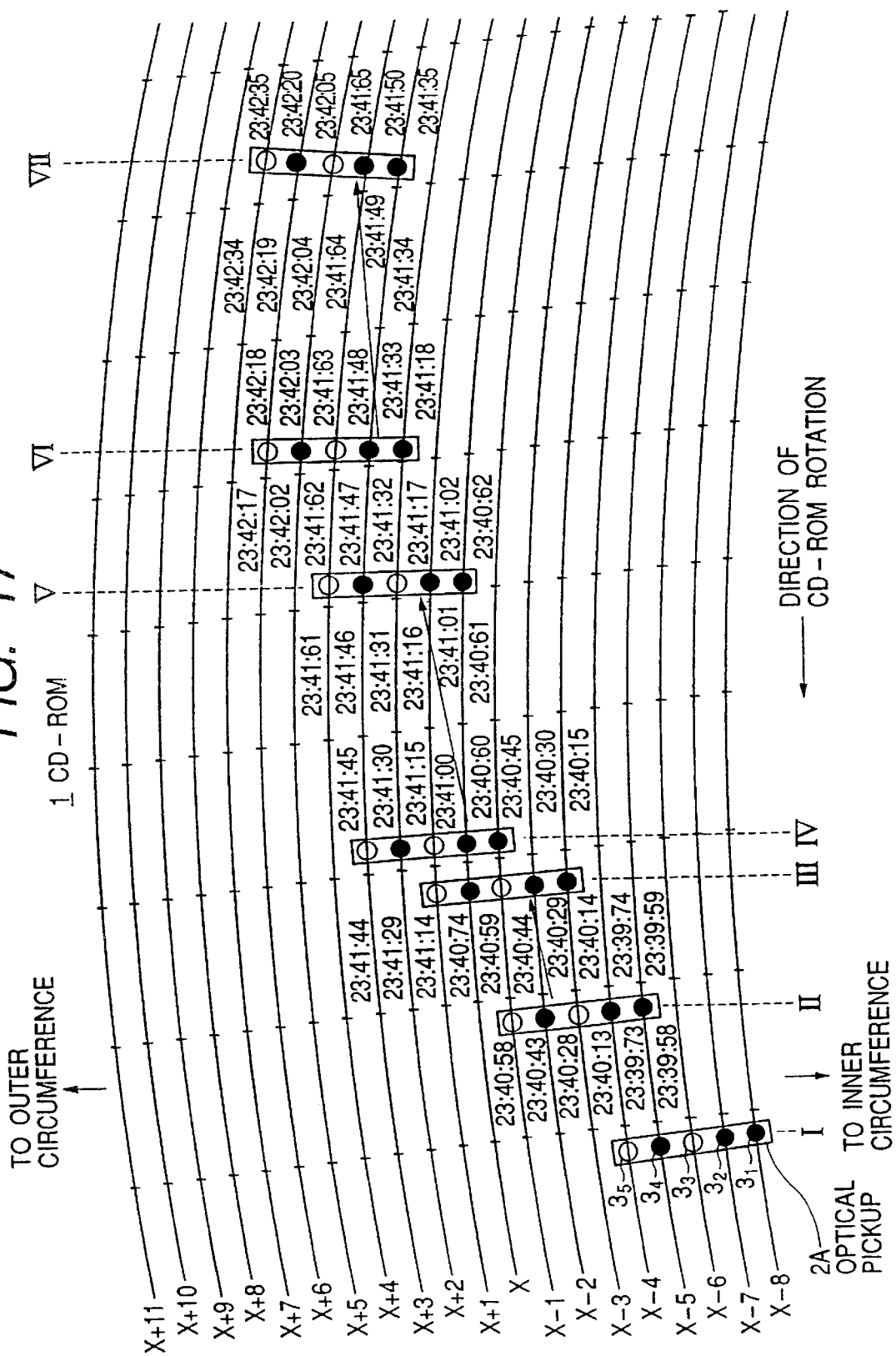
FIG. 17 is a diagram illustrating an example of a data read operation of the CD-ROM read apparatus shown in FIG. 1.

(9) Sixth Specific Read/write Operation (Read Unable by the light Beams $3_1$, $3_2$, and $3_4$, Refer to FIG. 17)

(9-1) Second Focus Bias Adjustment Process

If a Judgement of a presence/absence of a record data unreadable system shows that there are three record data unreadable systems of the light beams $3_1$, $3_2$ and $3_4$, it is impossible to read record data with three adjacent light beam systems. However, similar to the case shown in FIG. 15, continuously reading record data with data readable light beams during approximately (R+1) rotations and track jump by (Q−1) tracks in the forward direction can be repeated if Q is 2 or larger and R is 0 or larger, where Q is the number of tracks representing a distance between the innermost light beam and outermost light beam among the record data readable light beam systems, and R is the maximum number of adjacent record data unreadable light beams between the innermost and outermost record data readable light beams.

In the example shown in FIG. 17, of the record data readable light beam systems, the innermost light beam is the light beam $3_3$ and the outermost light beam is the light beam $3_5$ so that Q=2. In the adjacent record data unreadable light beams between the light beams $3_3$ and $3_5$, the maximum number of adjacent record data unreadable light beams is "1" because there is only the light beam $3_4$. As the h read light beam systems, all the two record data readable light beam systems $3_3$ and $3_5$ are allocated. The continuous read rotation number I is set as I=(R+1)=2, and the read track jump number J is set to J=(Q −1)=1 (Step S35). The second focus bias adjustment shown in FIG. 5 is executed to check whether the light beam $3_3$ or $3_5$ is included in the h=2 read light beams $3_3$ and $3_5$ (Step S36). In this example, since the light beam $3_5$ is included, the second focus bias adjustment process is terminated without changing $V_f$ from $V_f + W_1$.

The signal plane 1 is therefore positioned at the middle of the two in-focus points $P_3$ and the nearest $P_5$ of the two read light beams $3_3$ and $3_5$ along the optical direction of the objective lens 8, so that the in-focus points $P_3$ and $P_5$ are very near to the signal plane (refer to FIG. 7(2)). Thereafter, the objective lens 8 moves to follow a surface vibration of CD-ROM 1, under the control of the focus servo system, all the in-focus points $P_3$ and $P_5$ are maintained very near to the signal plane 1, and all the light beam $3_3$ and $3_5$ systems can reliably read the record data from CD-ROM 1.

(9-2) Data Read Operation

After the second focus bias adjustment process is completed, in accordance with the A-time data representative of the latest A-time data $AT_3$ input from the first signal processing circuit $26_3$ and the read start point A-time designated by the host computer, the track jump direction and number are determined so that the light beam $3_3$ at the innermost circumference among the h=2 read light beams is focussed in the track-on state on the track (x−1) one track inner than the track containing the read start point of the A-time (Step S35).

If the optical pickup 2 is at a position II shown in FIG. 17 after the second focus bias adjustment process is completed, the optical pickup 2 is jumped from the position II by two tracks in the forward direction so that the light beams $3_3$ and $3_5$ are focussed in the track-on state on the tracks (x−1) and (x+1). Then, reading the record data on the tracks (x−1) and (x+2) at the same time starts, by using two systems including the photodetector $PD_3$ to first signal processing circuit $26_3$ and photodetector $PD_5$ to first signal processing circuit $26_5$. When all the frame sync detection signals $FS_3$ and $FS_5$ of H level are input from the first signal processing circuits $26_3$ and $26_5$, the specific read/write command including the read system information "3, 5" is supplied to the P/S converter 30.

Thereafter, nearly similar to the case shown in FIG. 15 (in the case of FIG. 17, the write controllers $31_3$ and $31_5$ control to write the data $DATA_3$ and $DATA_5$ and A-time data $AT_3$ and $AT_5$ output from the first signal processing circuits $26_3$ and $26_5$, into the memories $32_3$ and $32_5$ and $33_3$ to $33_5$, and with reference to the the A-time data and start and end addresses stored in the memories $33_3$ and $33_5$, the read controller 34 controls to read record data stored in the memories $33_3$ and $33_5$ in the order of At-time by preventing the record data from being duplicated and omitted), an operation of reading record data from CD-ROM 1 by approximately I=2 rotations, jumping the optical pickup by the track jump number J=1, again reading record data from CD-ROM 1 by approximately I=two rotations, and jumping the optical pickup by the track jump number J=1 is repeated (refer to III to VII in FIG. 17) to sequentially read record data at high speed in the record order by preventing the record data from being duplicated and omitted.

For example, in order to read the record data from the 7 tracks from the track (x−1) to the track (x+5) shown in FIG. 17, only reading the record data of CD-ROM 1 during four rotations and one track jump are required and the record data can be read more quickly than record data is read with one light beam during 7 rotations of CD-ROM.

Figure 18:
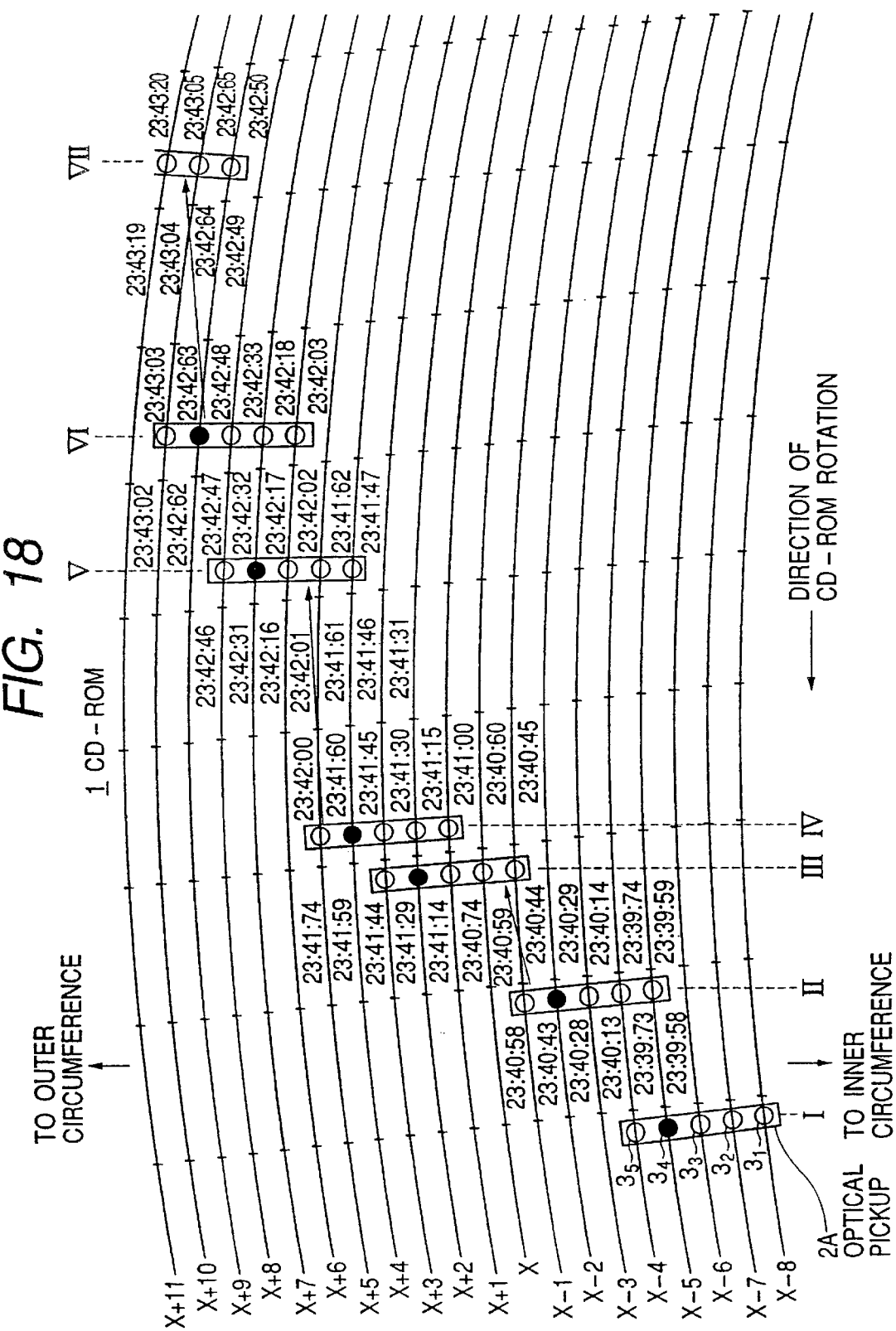
FIG. 18 is a diagram illustrating an example of a data read operation of the multibeam type CD-ROM read apparatus shown in FIG. 1.

(10) Seventh Specific Read/write Operation (Read Unable by the Light Beam 34, Refer to FIG. 18)

(10-1) Second Focus Bias Adjustment Process

If a judgement of a presence/absence of a record data unreadable system shows that there is one record data unreadable systems of the light beam $3_4$, it is possible to read the record data with the three-light beam systems $3_1$ to $3_3$ as described with the case (5) above (refer to FIG. 11). However, if the case shown in FIG. 15 is incorporated, the record data can be read at higher speed.

In the example shown in FIG. 18, of the record data readable light beam systems, the innermost light beam is the light beam $3_1$ and the outermost light beam is the light beam $3_5$ so that Q=4. In the adjacent record data unreadable light beams between the light beams $3_1$ and $3_5$, the maximum number R of adjacent record data unreadable light beams is "1". As the h read light beam systems, all the four record data readable light beam systems $3_1$ to $3_3$, and $3_5$ are allocated. The continuous read rotation number I is set as I=(R+1)=2, and the read track jump number J is set to J=(Q−1)=3 (Step S35). The second focus bias adjustment shown in FIG. 5 is executed to check whether the light beam $3_1$ or $3_5$ is included in the h=4 read light beams $3_1$ to $3_3$ and $3_5$ (Step S36). In this example, since the light beams $3_1$ and $3_5$ are included, the second focus bias adjustment process is terminated without changing $V_f$ from $V_f + W_1$.

The signal plane 1 is therefore positioned at the middle of the remotest $P_3$ and the nearest $P_1$ ($P_5$) along the optical direction of the objective lens 8, among the in-focus points $P_1$ to $P_3$, and $P_5$ of the four read light beams $3_1$ to $3_3$, and $3_5$, so that the in-focus points are very near to the signal plane (refer to FIG. 7(2)). Thereafter, the objective lens 8 moves to follow a surface vibration of CD-ROM 1, under the control of the focus servo system, all the in-focus points $P_1$ to $P_3$, and $P_5$ are maintained very near to the signal plane 1, and all the light beam $3_1$ to $3_3$ and $3_5$ systems can reliably read the record data from CD-ROM 1.

(10-2) Data Read Operation

After the second focus bias adjustment process is completed, in accordance with the A-time data representative of the latest A-time data $AT_3$ input from the first signal processing circuit $26_3$ and the read start point A-time designated by the host computer, the track jump direction and number are determined so that the light beam $3_1$ at the innermost circumference among the h=4 read light beams is focussed in the track-on state on the track (x−1) one track inner than the track x containing the read start point of the A-time (Step S35).

If the optical pickup 2 is at a position II shown in FIG. 18 after the second focus bias adjustment process is completed, the optical pickup 2 is jumped from the position II by four tracks in the forward direction so that the light beams $3_1$ to $3_3$, and $3_5$ are focussed in the track-on state on the tracks (x−1) to (x+1), and (x+3) −(refer to III in FIG. 18). Then reading the record data on the tracks (x−1) to (x+1) and (x+3) at the same time starts, by using four systems including the photodetector $PD_1$ to first signal processing circuit $26_1$, photodetector $PD_2$ to first signal processing circuit $26_2$, photodetector $PD_3$ to first signal processing circuit $26_3$, and photodetector $PD_5$ to first signal processing circuit $26_5$. When all the frame sync detection signals $FS_1$ to $FS_3$, and $FS_5$ of H level are input from the first signal processing circuits $26_1$ to $26_3$, and $26_5$, the specific read/write command including the read system information "1, 2, 3, 5" is supplied to the P/S converter 30.

Thereafter, nearly similar to the case shown in FIG. 15 (in the case of FIG. 18, the write controllers $31_1$ to $31_3$ and $31_5$, control to write the data $DATA_1$ to $DATA_3$ and $DATA_5$ and A-time data $AT_1$ to $AT_3$ and $AT_5$ output from the first signal processing circuits $26_1$ to $26_3$ and $26_5$, into the memories $32_1$ to $32_3$ and $32_5$ and $33_1$ to $33_3$ and $33_5$, and with reference to the the A-time data and start and end addresses stored in the memories $33_1$ to $33_3$ and $33_5$, the read controller 34 controls to read record data stored in the memories $33_1$ to $33_3$ and $33_5$ in the order of At-time by preventing the record data from being duplicated and omitted), an operation of reading record data from CD-ROM 1 by approximately I=2 rotations, jumping the optical pickup by the track jump number J=3, again reading record data from CD-ROM 1 by approximately I=two rotations, and jumping the optical pickup by the track jump number J=3 is repeated (refer to III to VII in FIG. 18) to sequentially read record data at high speed in the record order by preventing the record data from being duplicated and omitted.

For example, in order to read the record data from the 11 tracks from the track x to the track (x+10) shown in FIG. 18, only reading the record data of CD-ROM 1 during four rotations and one track jump are required. In contrast, the case shown in FIG. 11 requires reading the record data of CD-ROM 1 during four rotations and three track jumps.

Figure 19:
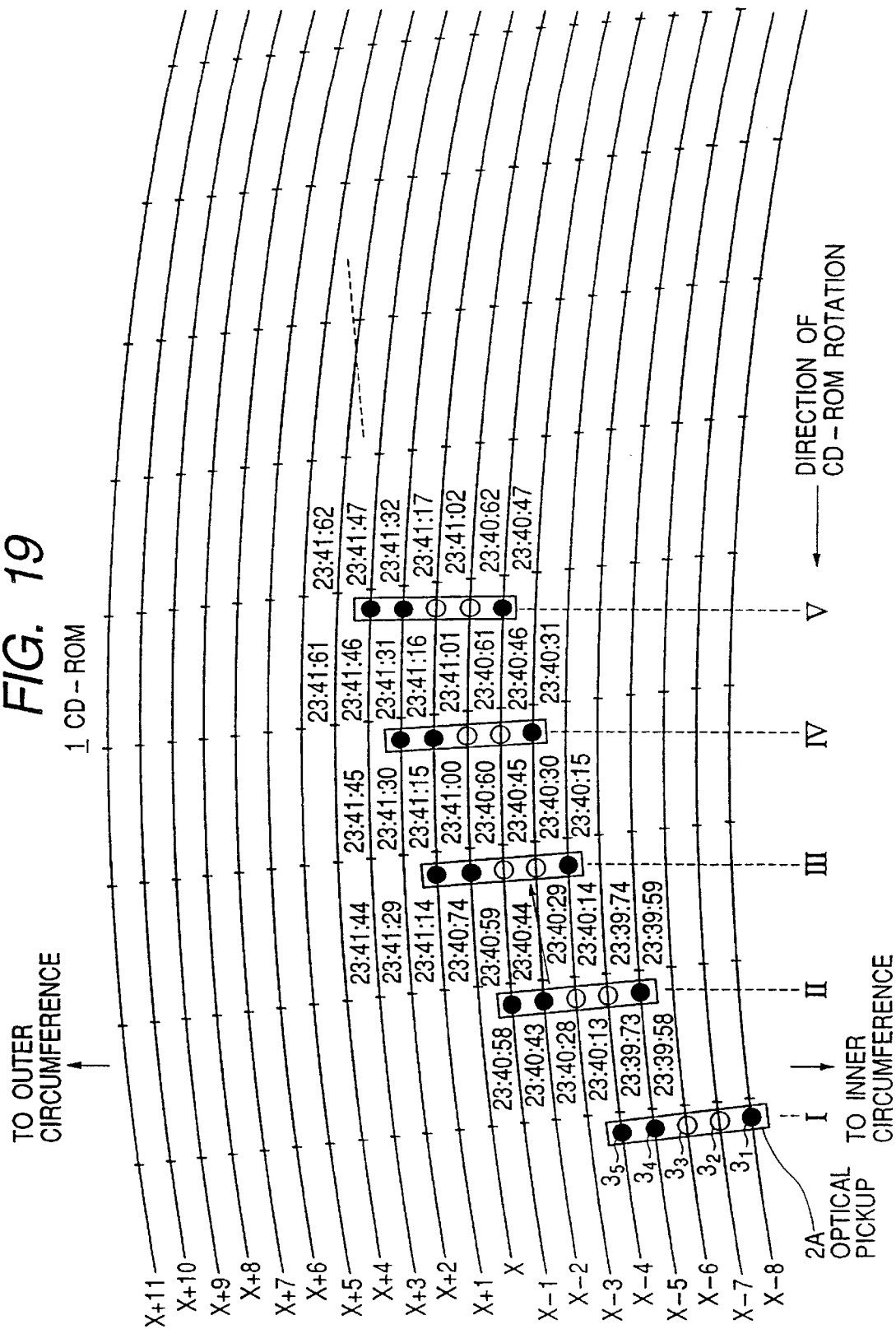
FIG. 19 is a diagram illustrating an example of a data read operation of the multibeam type CD-ROM read apparatus shown in FIG. 1.
Figure 20:
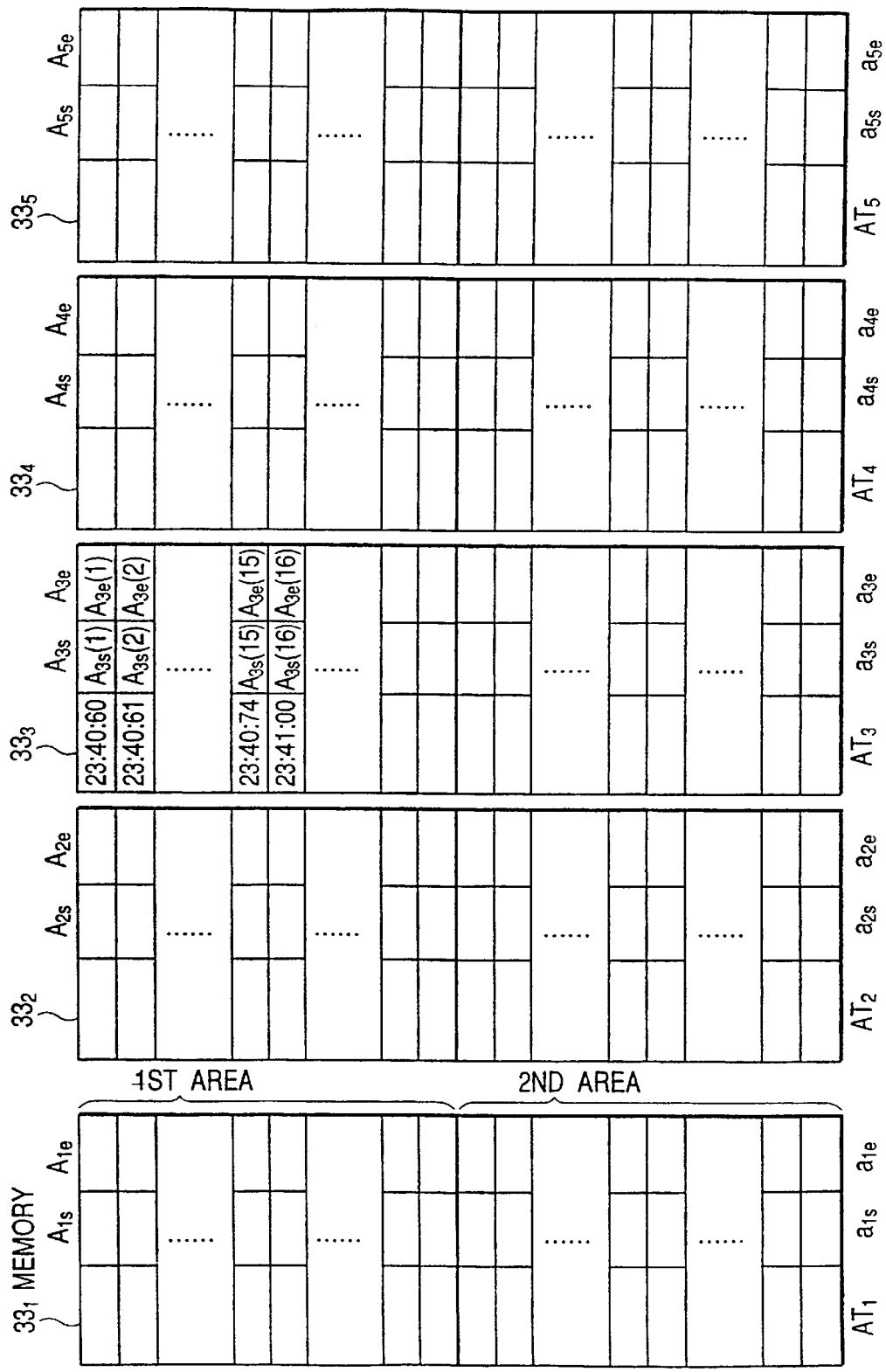
FIG. 20 is a diagram illustrating an example of the contents of the memory shown in FIG. 3.

(11) Eighth Specific Read/write Operation (Read Unable by the Light Beams $3_1$, $3_4$, and $3_5$, Refer to FIGS. 19 and 20)

(11-1) Second Focus Bias Adjustment

If the judgement of a presence/absence of a record data unreadable system shows that there are three record data unreadable systems of the light beams $3_1$, $3_4$, and $3_5$, record data is omitted if it is read with the remaining two adjacent light beam $3_2$ and $3_3$ by repetitively performing data read of CD-ROM 1 during one rotation or more and track jump in the forward direction. In this case, record data is continuously read from CD-ROM 1 by using the record data readable one light beam system.

Specifically, as the h read light beam system, the record data readable light beam $3_3$ near at the center is allocated among the record data readable light beams $3_2$ and $3_3$. The continuous read rotation number 1 is set infinite, and the read track jump number J is set to J=0.

The second focus bias adjustment shown in FIG. 5 is executes to check whether the light beam $3_1$ or $3_5$ is included in the h=1 read light beam $3_3$ (Step S36). In this example, since the light beams $3_1$ and $3_5$ are not included, then it is checked whether the light beam $3_2$ or $3_5$ is included (Step S38). In this example, since the light beam is included, the focus vias voltage generator circuit $22_4$ is controlled to change the value $V_f$ from the value of $V_f+W_1$ to the value of $V_f+W_2$ ($W_2<W_1$ to terminate the second focus bias adjustment process (at Step S39, it is set that $V_f=(V_f+W_1)-W_1+W_2=V_f-W_1+W_2$.

The signal plane 1 becomes therefore coincident with the in-focus points $P_2$ and $P_3$ of the read light beams $3_2$ and $3_3$ (refer to FIG. 7(3)). Thereafter, the objective lens 8 moves to follow a surface vibration of CD-ROM 1, under the control of the focus servo system, the record data of CD-ROM 1 can be reliably read with the light beam $3_3$ system.

(1-2) Data Read Operation

After the second focus bias adjustment process is completed, in accordance with the A-time data representative of the latest A-time data $AT_3$ input from the first signal processing circuit $26_3$ and the read start point A-time designated by the host computer, the track jump direction and number are determined so that the light beam $3_3$ at the innermost circumference among the h=1 read light beam is focussed in the track-on state on the track x (Step S35).

If the optical pickup 2 is at a position II shown in FIG. 19 after the second focus bias adjustment process is completed, the optical pickup 2 is jumped from the position II by two tracks in the forward direction so that the light beam $3_3$ is focussed in the track-on state on the track (x–1) (refer to III in FIG. 19). Then, reading the record data on the track x, by using one system including the photodetector $PD_3$ to first signal processing circuit $26_3$. When the frame sync detection signal $FS_3$ of H level is input from the first signal processing circuit $26_3$, the specific read/write command including the read system information "3" is supplied to the P/S converter 30.

Upon reception of the specific read/write command via the read controller 34, only the write controller $31_3$ indicated by the read system information "3" writes one block after another the data $DATA_3$ output from the first signal processing circuits $26_3$, into the first areas of the memories $32_3$, and writes the A-time data $AT_3$ corresponding to the data $DATA_3$ and the pairs of start addresses $A_{3s}$ and end addresses $A_{3e}$ in the memory $32_3$, into the first areas of the memory $33_3$. In the example shown in FIG. 19, in the first areas of the memory $33_3$, the A-time data is written from the frame of 23:40:60 (refer to FIG. 20).

Since only one record data read light beam is used as indicated by the read system information "3", the read controller 34 received the specific read/write command refers to the first areas of the memory $33_3$ indicated by the read system information "3" and used at the present read cycle to read the data in the A-time order starting from the oldest A-time from the first area of the memory $32_3$ and outputs the read data to the second signal processing circuit 40, without outputting the intercept command and track jump command. Therefore, the optical pickup 2 will not be jumped, and as CD-ROM rotates, the record data from the track (x–1) is sequentially read with the optical beam $3_3$ and output to the second signal processing circuit 40, by preventing the record data from being omitted.

Figure 21:
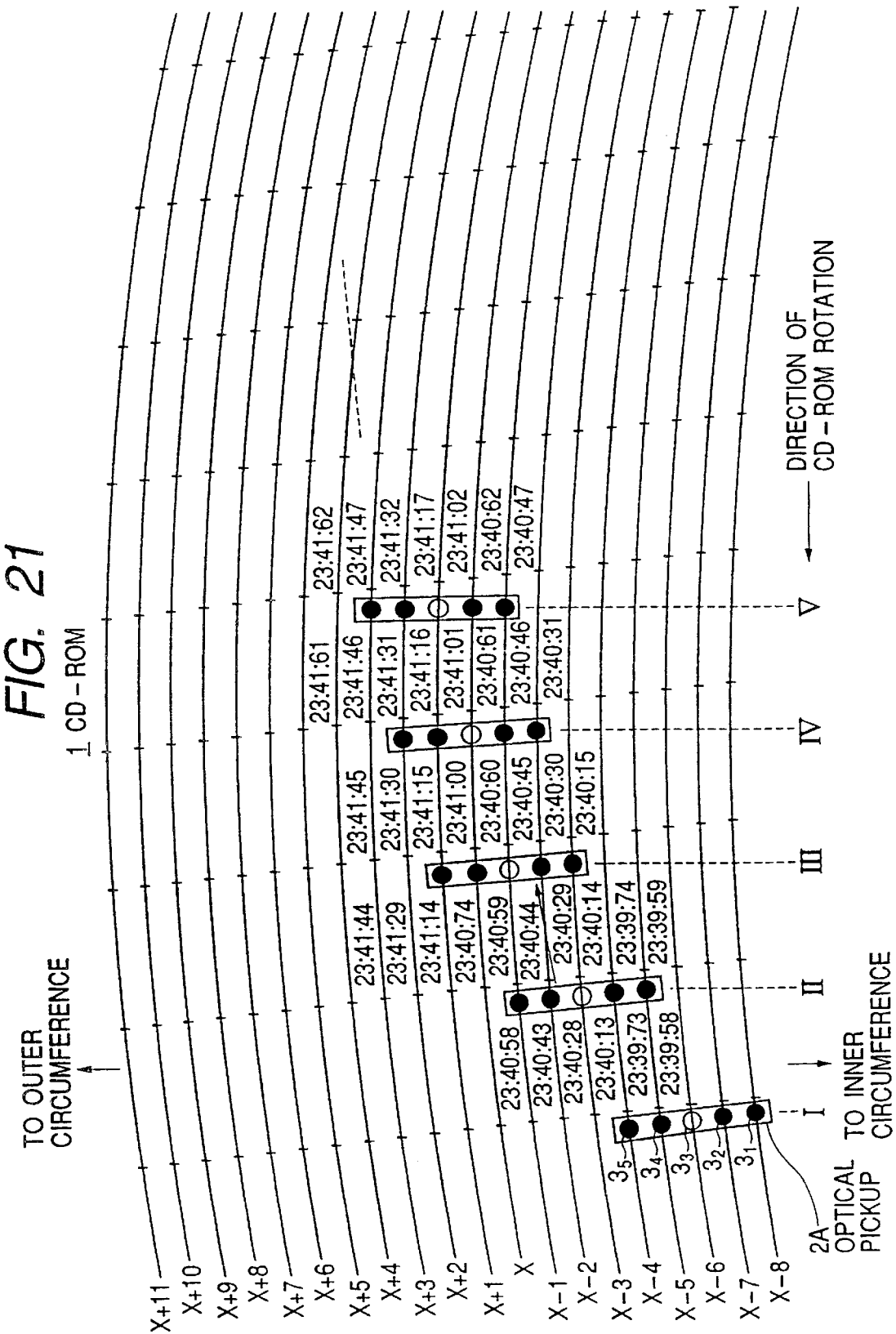
FIG. 21 is a diagram illustrating an example of a data read operation of the CD-ROM read apparatus shown in FIG. 1.

(12) Ninth Specific Read/write Operation (Read Unable by the Light Beams $3_1$, $32_1$, $3_4$, and $3_5$, Refer to FIG. 21)

(11-1) Second Focus Bias Adjustment

If the judgement of a presence/absence of a record data unreadable system at Step S33 shown in FIG. 5 shows that there are four record data unreadable systems of the light beams $3_1$, $3_2$, $3_4$, and $3_5$, record data is omitted if it is read with only one remaining light beam $3_3$ by repetitively performing data read of CD-ROM 1 during one rotation or more and track jump in the forward direction. Also in this case, record data is continuously read from CD-ROM 1.

Specifically; as the h read light beam system-,the record data readable light beam $3_3$ is allocated among the h record data readable light beam. The continuous read rotation number I is set infinite, and the read track jump number J is set to J=0 (Step S35).

Thereafter, quite similar to the case shown in FIG. 19, the second focus bias adjustment process is performed to change the value $V_f$ by $-W_1$ (Step S40), and the optical pickup is jumped in the forward direction to make the light beam $3_3$ in the track-on state on the track,(x–1) to read record data from the track (x–1) with the light beam $3_3$. In this case, $V_f=(V_f+W_1)-W_1=V_f$, and the light beam $3_3$ is in the perfect in-focus state as shown in FIG. 7(1).

In the above embodiments, if all the five light beam systems $3_1$ to $3_5$ can read the record data, the signal plane of CD-ROM 1 is set at just the middle of the remotest in-focus point and nearest in-focus point and at the center of the five in-focus points $P_1$ to $P_5$ of the light beams $3_1$ to $3_5$ along the optical axis direction of the objective lens 8. If some of the five light beam systems $3_1$ to $3_5$ cannot read the record data, the signal plane of CD-ROM 1 is set at just the middle of the remotest in-focus point and nearest in-focus point and at the center of the h read light beams along the optical axis direction of the objective lens 8. Therefore, if all the five light beam systems $3_1$ to $3_5$ can read the record data, it is possible to avoid a poor in-focus state on the signal plane of the five light beams $3_1$ to $3_5$ and reliably read the record data from CD-ROM 1. Similarly, even if some of the five light beam systems $3_1$ to $3_5$ cannot read the record data, it is possible to avoid a poor in-focus state on the signal plane 1 of the h read light beams and reliably read the record data from CD-ROM 1. If all the five light beam systems $3_1$ to $3_5$ can read the record data, the system controller 50 performs the focus bias adjustment so that the signal plane of CD-ROM 1 is positioned at the center of the in-focus points $P_1$ to $P_5$ of the five light beams $3_1$ to $3_5$ along the optical axis direction of the objective lens 8. If some of the five light beam systems $3_1$ to $3_5$ cannot read the record data, the signal plane of CD-ROM 1 is set at the middle of the in-focus points of the allocated h light beams. Therefore, if all the five light beam systems $3_1$ to $3_5$ can read the record data, it is possible to avoid a poor in-focus state on the signal plane of the five light beams $3_1$ to $3_5$ and reliably read the record data from CD-ROM 1, regardless of the surface vibration of CD-ROM 1. Similarly, even if some of the five light beam systems $3_1$ to $3_5$ cannot read the record data it is possible to avoid a poor in-focus state on the signal plane 1 of the h read light beams and reliably read the record data from CD-ROM 1, regardless of the surface vibration of CD-ROM 1.

Figure 22A:
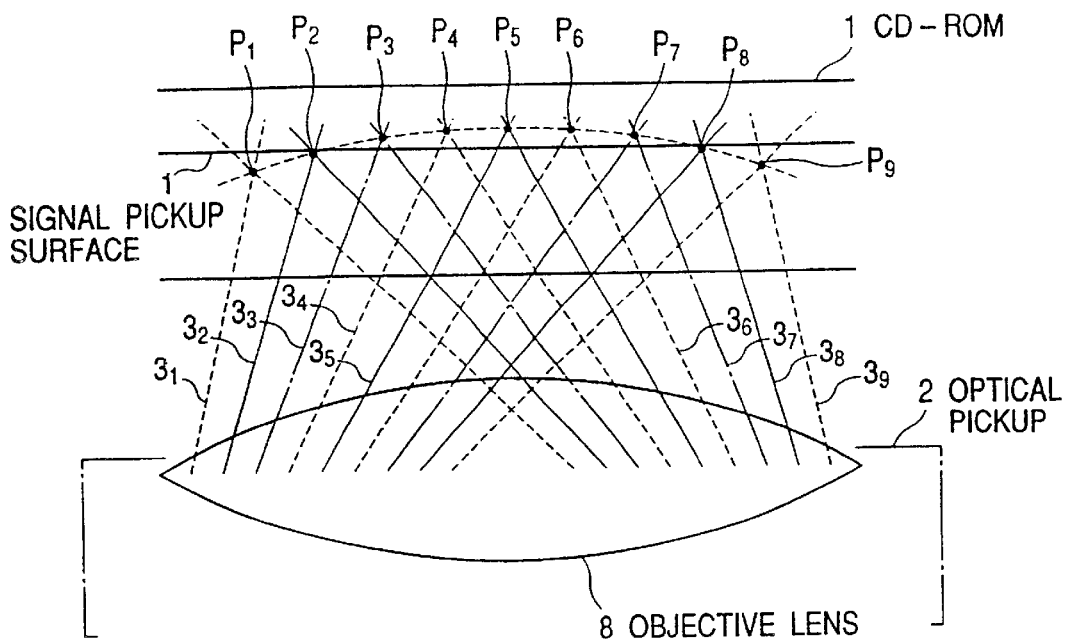
FIGS. 22(1) and 22(2) are diagrams illustrating a modification of an optical pickup shown in FIG. 1, with a partial area being omitted.
Figure 22B:
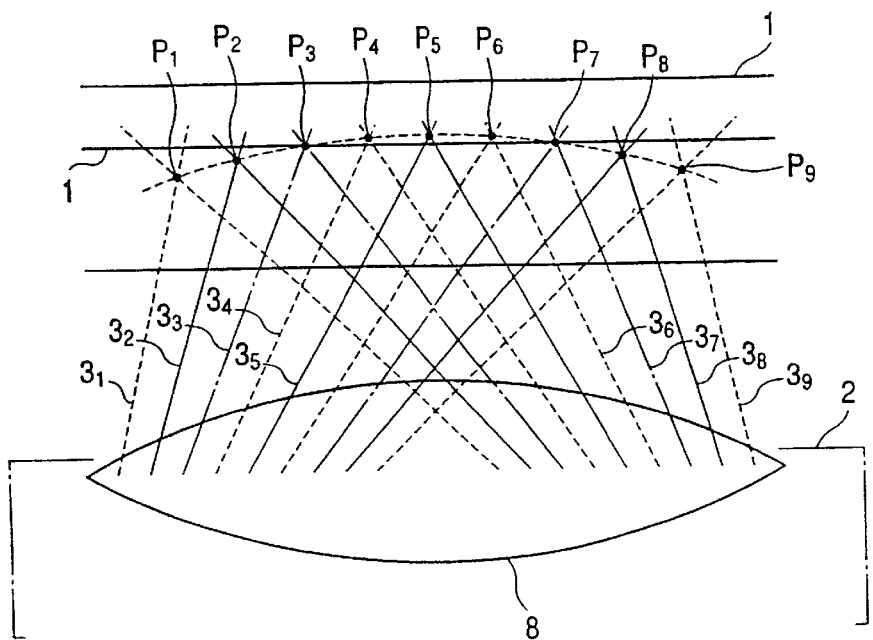

In the above embodiments, the number of light beams is set as n=5. The number of light beams may be set to other values such as 7 and 9. For example, as shown in FIG. 22, if nine light beams $3_1$ to $3_9$ are used (focus error signal and tracking error signal are generated by using the light beam $3_1$ reflected from the signal plane of CD-ROM), the first focus bias adjustment process makes the signal plane 1 be positioned just at the midst of the remotest in-focus point $P_5$ and nearest in-focus point $P_5$ ($P_9$) along the optical axis direction of the objective lens 8 (refer to FIG. 22(l)). If the judgement of a presence/absence of a record data unreadable system shows that there is no record data unreadable system, the light beams $3_1$ to $3_9$ are allocated as the h read light beams, and it is set that I=1 and J=7. The second focus bias adjustment process does not change the value $V_f$ and retains the state of FIG. 22(1).

If the judgement of a presence/absence of a record data unreadable system shows that there are two record data unreadable systems of the light beams $3_1$ and $3_9$, the light beams $3_2$ to $3_8$ are allocated as the h read light beams, and it is set that I=1 and J=5. The second focus bias adjustment process changes the value $V_f$ SO that the signal plane is positioned at the middle of the remotest in focus point $P_5$ and nearest in-focus point $P_2$ (Pa) along the optical direction of the objective lens 8 among the in-focus points of the seven read light beams (refer to FIG. 22(2)).

Different from the above, if the light beam systems $3_7$ and $3_8$ cannot read record data, then Q=8 and R=2. Seven light beam systems $3_1$ to $3_6$ and $3_9$ are allocated as the h read light beams. The continuous read rotation number I is set as I=(R+1)=3 and the track jump number J is set as J=(Q−1)=7. The second focus bias adjustment process does not change the value $V_f$ and retains the state of FIG. 22(1).

Figure 23:
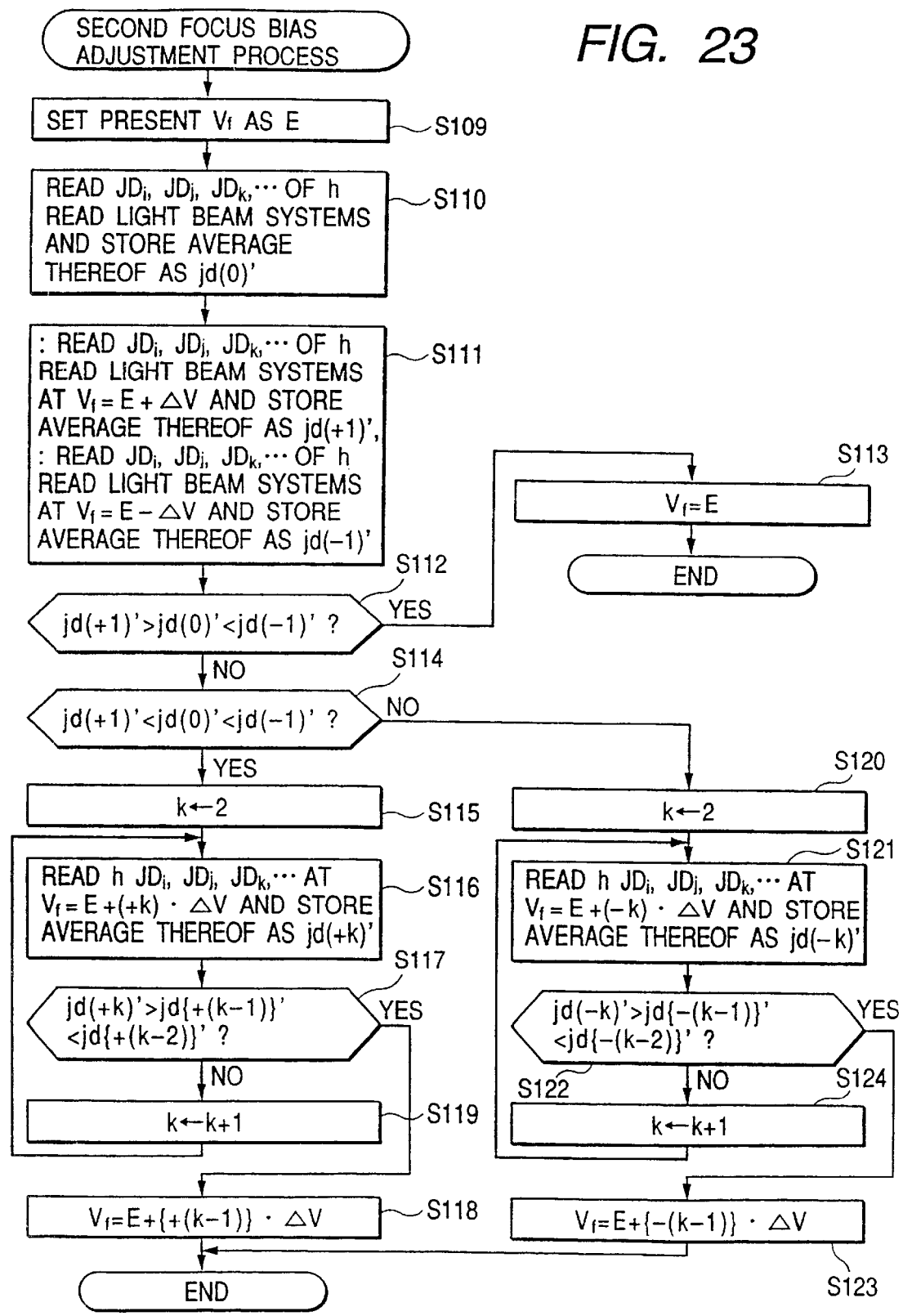
FIG. 23 is a flow chart illustrating a second focus adjusting process shown in FIG. 5 according to another embodiment.

The first signal processing circuits $26_1$, $26_2$, $26_4$, and $26_5$ may be added with measuring circuits for measuring jitter amounts of the binarized RF signals and outputting jitter amount data $JD_1$, $JD_2$, $JD_4$, and $JD_5$, and the second focus bias adjustment process shown in FIG. 5 may be changed as illustrated in FIG. 23.

Referring to FIG. 23, first the system controller 50 stores the value $V_f$ set at the first focus bias adjustment process at Step S3 of FIG. 5 in its memory (not-shown) as E (Step S109). Of the jitter amount data $JD_1$ to $JD_5$ measured by the first signal processing circuits $26_1$ to $26_5$, jitter amount data $JD_i$, $JD_k$, ... of the h read light beam systems are read and its average jd(0) is stored in the memory (Step S110).

Next, the focus bias voltage generator circuit $22_4$ is controlled to increase $V_f$ by $\Delta V$ (positive value) from E (V) and the jitter amount data $JD_i$, $JD_k$, ... of the h read light beams systems are read and an average value thereof is stored stored in the memory as jd(+1). The voltage $V_f$ is decreased by $\Delta V$ (negative value) from E (V) and the jitter amount data $JD_i$, $JD_k$, ... of the h read light beams systems are read and an average value thereof is stored stored in the memory as jd(−1) (Step S111).

The values jd(+1), jd(0), and jd(−1) are compared and if jd(+1)>jd(0)<jd(−1) (YES at Step S112), the average jitter amount is minimum at $V_f$=E (V) and it can be considered that the signal plane 1 of CD-ROM 1 is positioned at the middle of the in-focus points $P_i$, $P_j$, $P_k$, ... of the h read light beams $3_i$, $3_j$, $3_k$... along the optical axis of the objective lens 8, that all the h read light beams are in an optimum state of perfect in-focus, and that there is no light beam in a state far from the perfect in-focus state. Therefore, the focus bias voltage generator circuit $22_4$ is controlled to set $V_f$ to E(V) (Step S113).

If jd(+1)'<jd(0)'<jd(−1) instead of jd(+1)'>jd(0)'<jd(−1)' (YES at Step S114), it is set that k=2. (Step S115) and $V_f$=E+(+2)·$\Delta V$, and the jitter amount $JD_i$, $JD_k$, ... of the h read light beams are read and stored as jd(+2)' (Step S116). If jd(+2)'>jd(+1)'<jd(0)' (YES at Step S117), the average jitter amount is minimum at $V_f$=E+(+1)·$\Delta V$ and it can be considered that the signal plane 1 of CD-ROM 1 is positioned at the middle of the in-focus points $P_i$, $P_j$, $P_k$, ... of the h read light beams $3_i$, $3_j$, $3_k$, ... along the optical axis of the objective lens 8, that all the h read light beams are in an optimum state of perfect in-focus, and that there is no light beam in a state far from the perfect in-focus state. Therefore, the focus bias voltage generator circuit $22_4$ is controlled to set $V_f$ to to E+(+1)19 $\Delta V$ (Step S118).

If not jd(+2)'>jd(+1)'<jd(0)' (NO at Step S117), the value k is incremented to 3 (Step S119), and the flow returns to Step S116 to repeat the above operations. If jd(+k)'>jd{+(k−1)}'<jd{+(k−2)}' (YES at Step S117), the average jitter amount is minimum at $V_f$={+(k−1)}·($\Delta V$) and it can be considered that all the in-focus points $P_i$, $P_j$, $P_k$, ... of the h read light beams $3_i$, $3_j$, $3_k$, ... are in an optimum state of perfect in-focus. Therefore, the focus bias voltage generator circuit $22_4$ is controlled to set $V_f$ to to E+{+(k−1)}·($\Delta V$) (Step S118).

If not jd(+1)'<jd(0)'<jd(−1)' at Step S114, the value k is set to 2 (Step S120). $V_f$ is set to E+(−2)·$\Delta V$ and the jitter amount data $JD_i$, $JD_k$, ... are read and stored as an average value jd(−2)' (Step S121). If jd(0)'>jd(−1)'<jd(−2)' (YES at Step S122), the average jitter amount is minimum at $V_f$=E +(−1)·$\Delta V$ and it can be considered that all the in-focus points $P_i$, $P_j$, $P_k$, .... of the h read light beams $3_i$, $3_j$, $3_k$, ... are in an optimum state of perfect in-focus relative to the signal plane 1. Therefore, the focus bias voltage generator circuit $22_4$ is controlled to set $V_f$ to to E+(−1)·($\Delta V$) (Step S123).

If not jd(0)'>jd(−1)'<jd(−2)' at Step S122, the value k is incremented to 3 (Step S124) and the flow returns to Step S121 to repeat the above operations. If jd{−(k−2)}'>jd{−(k−1)}'<jd(−k)}' (YES at Step S122), the average jitter amount is minimum at $V_f$=E+{−(k−1)}·($\Delta V$) and it can be considered that all the in-focus points $P_i$, $P_j$, $P_k$, ... of the h read light beams are in an optimum state of perfect in-focus relative to the signal plane 1. Therefore, the focus bias voltage generator circuit $22_4$ is controlled to set $V_f$ to to $E+\{-(k-1)\}\cdot\Delta V$ (Step S123).

After the second focus bias adjustment is completed in the above manner, all the h read light beams $3_1, 3_j, 3_k, \ldots$ can enter the perfect in-focus state relative to the signal plane 1, and the in-focus state of the h read light beams relative to the signal plane can be optimized with ease. Thereafter, since the objective lens 8 moves to follow the surface vibration of CD-ROM 1, any of the h read light beams will not become far from the perfect in-focus relative to the signal plane 1, and any of the h read light beam systems can reliably read record data from CD-ROM 1.

In the second focus bias adjustment processes illustrated in FIG. 6 (FIG. 23), the bias voltage value $V_f$ is determined so that the jitter amount data $JD_3$ (average jitter amount data $JD_i, JD_j, JD_k, \ldots$) measured by the first signal processing circuit $26_3$ (circuits $26_i, 26_j, 26_k, \ldots$) becomes minimum to thereby make the light beam $3_3$ temporarily enter the in-focus state. Instead, the first signal processing circuit $26_3$ (circuits $26_1$ to $26_5$) may be provided with error detection/correction circuits which descramble the EFM demodulated data in the unit of one block, perform error detection/correction based on CIRC codes (error detection/correction with P parities, deinterleaveing, error detection/correction with Q parities), measure error rates detected through error detection with P parities, and output error rate data $ED_3$ ($EF_1$ to $ED_5$). $JD_3$ ($JD_i, JD_j, JD_k, \ldots$) in FIG. 6 (FIG. 23) are replaced by $ED_3$ ($ED_i, ED_j, ED_k, \ldots$), and the bias voltage value $V_f$ is set so that the value $ED_3$ ($ED_i, ED_j, ED_k, \ldots$) becomes minimum and the light beam $3_3$ is focussed onto the signal plane 1. In this manner, the second focus bias adjustment may be performed.

Measuring the error rate for each light beam system may be performed by the second signal processing circuit. Specifically, the second signal processing circuit 40 is provided with an error detection/correction circuit which measures an error rate detected through error detection with P parities when perform error detection/correction based on CIRC codes (error detection/correction with P parities, deinterleaveing, error detection/correction with Q parities) is performed, and outputs the measured error rate. For the focus bias adjustment, the data $DATA_3$ (data $DATA_1$ to $DATA_5$) output from the first signal processing circuit $26_3$ ($26_1$ to $26_5$) are supplied via the P/S converter 30 to the second signal processing circuit 40 which measures the error rate for each light beam system and outputs error rate data $ED_3$ ($ED_1$ to $ED_5$) of the light beam system $3_3$ (light beam systems $3_1$ to $3_5$) and sets the bias voltage value $V_f$ which minimizes the value $ED_3$ ($ED_i, ED_j, ED_k, \ldots$).

In the processes of FIG. 23 and their modifications, if there is no record data unreadable light beam system, the bias voltage value $V_f$ is set so that the average jitter amount (average error rate) of all the five light beams becomes minimum. Instead, even if there is no record data unreadable light beam system, the jitter amount of the binarized RF signal or the error rate of read record data may be measured for predetermined two or more light beam systems among the n=5 light beams $3_1$ to $3_5$, such as two systems of the light beams $3_1$ and $3_3$ two systems of the light beams $3_2$ and $3_4$, and three systems of the light beams $3_1, 3_3,$ and $3_5$. The averages of these measured jitter amounts or error rates are used for the focus bias adjustment. Also in this case, it is possible to avoid a poor in-focus state of a light beam on the signal plane 1, irrespective of the surface vibration of CD-ROM 1, and record data can be reliably read from CD-ROM 1.

Instead of measuring the error rate of data symbols read from CD-ROM 1, an error rate of sub-codes read from CD-ROM 1 may be measured to perform the focus bias adjustment.

Also in the above embodiments, although CD-ROM is rotated at a constant linear velocity, it may be rotated at a constant angular velocity (CAV). Other optical discs with a spiral track of the type different from CD-ROM may also be used such as CD-WO, DVD, DVD-ROM and DVD-RAM, or other optical discs with a concentric track may also be used such as LD and MO. The number of light beams for reading record data on tracks at the same time may be 3, 7 or the like instead of 5.

What is claimed is:

1. A multibeam type optical disc read apparatus comprising an optical system (2A) including an objective lens (8) for applying n light beams at the same time to respective n tracks on a signal plane of an optical disc, focus servo means (22, 23) for controlling the optical system by using a focus error signal (FE) to make the n light beams focus the signal plane of the optical disc by moving the objective lens to follow a surface vibration of the optical disc and signal processing means (20A) for generating a signal for each light beam from a detection output of the light beam reflected from the signal plane and reading data recorded on the tracks to which the light beams were applied, based upon the detection output of the light beam, characterized in that said focus servo means performs a focus bias adjustment by applying a first focus bias (Vf) to the focus error signal so that one of the n light beams focus on the signal plane of the optical disc, and then modifying the first focus bias with a predetermined focus bias ($W_1$ or $W_2$) so that the signal plane of the optical disc is positioned at the middle of respective in-focus points of the n light beams as viewed along an optical axis direction of the optical system.

2. A multibeam type optical disc read apparatus according to claim 1, further comprising jitter measuring means (263) for measuring a jitter amount or error rate of a binarized signal for two or more predetermined light beam systems among the n light beams;

wherein said focus servo means performs a focus bias adjustment so that an average of jitter amounts or error rates of binarized signals measured by said measuring means becomes minimum.

3. A multibeam type optical disc read apparatus comprising an optical system (2A) including an objective lens (8) for applying n light beams at the same time to respective n tracks on a signal plane of an optical disc, focus servo means (22, 23) for controlling the optical system to make the n light beams focus on the signal plane of the optical disc by moving the objective lens to follow a surface vibration of the optical disc and signal processing means (20A) for generating a signal for each light beam from a detection output of the light beam reflected from the signal plane and reading data recorded on the tracks to which the light beams are applied, based upon the detection output of the light beam, wherein if there are some light beam systems which cannot read record data among the n light beams, h read light beam systems are selected from the remaining record data readable light beam systems, and the record data is read with the set h read light beam systems, characterized in that if the record data is read with all the n light beam systems, said focus servo means performs a focus bias adjustment so that the signal plane of the optical disc is positioned at the middle of respective in-focus points of the n light beams as viewed along an optical axis direction of the optical system, and if there are some record data unreadable light beam systems among the n light beams, said focus servo means performs a focus bias adjustment so that the signal plane of the optical disc is positioned at the middle of respective in-focus points of the h read light beam systems as viewed along an optical axis direction of the objective lens.

4. A multibeam type optical disc read apparatus according to claim 3, further comprising measuring means (263) for measuring a jitter amount or error rate of a binarized signal for each light beam system;

wherein if the record data can be read with all the n light beam systems, said focus servo means performs a focus bias adjustment so that an average of jitter amounts or error rates of binarized signals for each of the n light beam systems measured by said measuring means becomes minimum; and if there are some record data unreadable light beam systems among the n light beams, said focus servo means performs a focus bias adjustment so that an average of jitter amounts or error rates of binarized signals for each of the h read light beam systems measured by said measuring means becomes minimum.

5. A multibeam optical disc apparatus comprising a light source (4) for generating a light beam, grating means (5) for diffracting the light beam and forming 0 order, +/− first order, . . . , +/− n-th order diffraction light beams, an optical system (8) for focusing the 0 order, +/− first order, . . . , +/− n-th order diffraction light on a signal plane of an optical disc, focus servo means (22, 23) for controlling a focusing of said optical system and processing means (20A) for generating a signal for each of the 0 order, +/− first order, . . . , +/− n-th order diffraction light beams from a detection output of the diffraction light beam reflected from the signal plane and reading data recorded on the tracks to which the diffraction light beams were applied, based upon the detection output of the diffraction light beam, characterized in that said focus servo means controls said optical system to focus the diffraction light beams so that the signal plane of the optical disc becomes coincident with a middle point of respective in-focus points of the 0 order, +/− first order, . . . , +/− n order diffraction light beams, as viewed along an optical axis direction of the optical system, by executing a first focus control for determining a control amount necessary for focusing the 0 order diffraction light onto the signal plane of the optical disc, and a second focus control for controlling a focusing of said optical system by using the control amount modified by a predetermined valued value ($W_1$ or $W_2$).

6. A multibeam optical disc read apparatus according to claim 5, wherein, said focus servo means executes a first focus control for determining a control amount necessary for focusing the 0 order diffraction light beam onto the signal plane of the optical disc, and modifies the control amount by measuring a jitter amount of the signal for each diffraction light beam, in an in-focus state that the 0 order diffraction light beam is focused onto the signal plane of the optical disc while said optical disc is controlled by the control amount, or in a state deviated by a predetermined amount from the in-focus state.

7. A multibeam optical disc read apparatus according to claim 5, wherein effective detection outputs are determined from the detection outputs of the 0 order, +/− first order, . . . , +/−n order diffraction light beams, and said optical system focuses the diffraction light beams so that the signal plane of the optical disc becomes coincident with a middle point of respective in-focus points of the diffraction light beams corresponding to the effective detection outputs, as viewed along an optical axis direction of the optical system.

8. A multibeam optical disc read apparatus according to claim 5, further comprising a waveshape equalizer circuit ($24_1$–$24_5$) compensating high frequency characteristics of the signal, a pair of waveshape equalize circuits provided in correspondence with the +/− i-th order diffraction light beams having the same waveshape equalizing characteristics.

9. A multibeam optical disc read apparatus in which different n, where n is an odd number of 3 or larger, light beams are applied at the same time to respective n tracks on a signal plane of an optical disc, a signal for each light beam is generated from a detection output of the light beam reflected from the signal plane and waveshape-equalized by waveshape equalizer means provided for each light beam to raise a gain of high frequency components and compensate for the high frequency components, and each signal is binarized and demodulated to read data recorded on the tracks to which the light beams were applied, comprising laser beam generating means (4) for generating a single laser beam which is made vertically incident upon a diffraction grating (5) to generate 2m+1, where, m=(n−1)/2, light beams of 0 order, +/− first order, . . . , +/− m-th order diffraction light beams; an optical system (2A) provided with an objective lens (8) focusing the (2m+1) light beams on the signal plane of the optical disc, the optical system being disposed so that the light beam of the 0 order diffraction light beam is vertically incident upon the optical disc; and a pair of waveshape equalizer means ($24_1$–$24_5$) provided in correspondence with the +/− i-th, where i is 1, 2, . . . , m, order diffraction light beams have said waveshape equalizer characteristics; and focus servo means (22, 23) for controlling the optical system to make the 2m+1 light beams in the in-focus state on the signal plane of the optical disc, by moving the objective lens characterized in that wherein said focus servo means performs a focus bias adjustment so that the signal plane of the optical disc is located at the predetermined position between an in-focus point of the 0 order diffraction light beams and an in-focus point of the +/− m-th order diffraction light beams, as viewed along anoptical axis of the objective lens.

10. A multibeam type optical disc read apparatus according to claim 9, further comprising:

measuring means (263) for measuring a jitter amount or error rate of a binarized signal for two or more predetermined light beam systems among the n light beams, wherein said focus servo means performs a focus bias adjustment so that an average of jitter amounts or error rates of binarized signals measured by said measuring becomes minimum.

* * * * *